(12) United States Patent
Kim et al.

(10) Patent No.: US 11,301,317 B2
(45) Date of Patent: Apr. 12, 2022

(54) METHOD OF CONTROLLING REPAIR OF VOLATILE MEMORY DEVICE AND STORAGE DEVICE PERFORMING THE SAME

(71) Applicant: SAMSUNG ELECTRONICS CO., LTD., Suwon-si (KR)

(72) Inventors: Dong Kim, Hwaseong-si (KR); Inhoon Park, Suwon-si (KR); Jangseon Park, Gwangju-si (KR); Hyunglae Eun, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 58 days.

(21) Appl. No.: 16/790,256

(22) Filed: Feb. 13, 2020

(65) Prior Publication Data

US 2021/0026728 A1 Jan. 28, 2021

(30) Foreign Application Priority Data

Jul. 23, 2019 (KR) .......................... 10-2019-0088724

(51) Int. Cl.
 *G06F 11/07* (2006.01)
 *G06F 11/10* (2006.01)
(52) U.S. Cl.
 CPC ........ *G06F 11/0793* (2013.01); *G06F 11/076* (2013.01); *G06F 11/0727* (2013.01); *G06F 11/1068* (2013.01)
(58) Field of Classification Search
 CPC ............ G06F 11/0793; G06F 11/0727; G06F 11/076; G06F 11/1068; G06F 11/106; G06F 11/1048; G11C 29/42

(Continued)

(56) References Cited

U.S. PATENT DOCUMENTS 8,473,791 B2  6/2013 Shaw et al.
8,549,366 B2 10/2013 Higeta et al.
(Continued)

FOREIGN PATENT DOCUMENTS

JP      2017-151620 A    8/2017
KR  10-1996-0008828 B1  7/1996

OTHER PUBLICATIONS

Wikipedia "data scrubbing" page from date Jul. 20, 2019, retrieved from https://web.archive.org/web/20190720184123/https://en.wikipedia.org/wiki/Data_scrubbing (Year: 2019).*

(Continued)

*Primary Examiner* — Yair Leibovich
(74) *Attorney, Agent, or Firm* — Sughrue Mion, PLLC

(57) ABSTRACT

A method of controlling repair of a volatile memory device, includes, performing a patrol read operation repeatedly to provide error position information of errors included in read data from a volatile memory device, generating accumulated error information by accumulating the error position information based on the patrol read operation performed repeatedly, determining error attribute based on the accumulated error information, the error attribute indicating correlation between the errors and a structure of the volatile memory device, and performing a runtime repair operation with respect to the volatile memory device based on the accumulated error information and the error attribute. The errors may be managed efficiently to prevent failure of the volatile memory device, and thus performance and lifetime of the volatile memory device and the storage device may be enhanced.

18 Claims, 22 Drawing Sheets

(58) Field of Classification Search
USPC .......................................................... 714/6.11
See application file for complete search history.

(56) References Cited

U.S. PATENT DOCUMENTS

| | | |
|---|---|---|
| 9,547,589 B2 | 1/2017 | Yu et al. |
| 9,824,777 B2 | 11/2017 | Mun et al. |
| 10,114,695 B2 | 10/2018 | Sakurai |
| 2017/0344299 A1 | 11/2017 | Ivanov |
| 2018/0246775 A1 | 8/2018 | Sankaranarayanan et al. |
| 2019/0027230 A1* | 1/2019 | Ryu ..................... G11C 29/42 |
| 2019/0079861 A1 | 3/2019 | Amaki et al. |
| 2020/0042380 A1* | 2/2020 | Roberts ............... G06F 11/1092 |

OTHER PUBLICATIONS

Communication dated Oct. 1, 2020, from the European Patent Office in counterpart European Application No. 20164785.6.

* cited by examiner

| DATA BITS | PARITY BITS | | | PARITY O/H | | |
|---|---|---|---|---|---|---|
| | SEC | SEC-DED | DEC | SEC | SEC-DED | DEC |
| 8 | 4 | 5 | 8 | 50.0% | 62.5% | 100% |
| 64 | 7 | 8 | 14 | 10.9% | 12.5% | 21.9% |
| 128 | 8 | 9 | 16 | 6.3% | 7.0% | 12.5% |
| 256 | 9 | 10 | 18 | 3.5% | 3.9% | 7.0% |
| 512 | 10 | 11 | 20 | 2.0% | 2.1% | 3.9% |

FIG. 7

| PFRADD | EN | ATT |
|---|---|---|
| RAa | 2 | N/A |
| RAb | 1 | N/A |
| RAc | 5 | ATT1 |
| RAd | 4 | ATT1 |
| RAe | 0 | ATT1 |
| RAf | 2 | N/A |
| ⋮ | ⋮ | ⋮ |

AET1, AET2, AET3, ...

FIG. 16

| PFRADD | PFCADD | | | | EN | ATT |
|---|---|---|---|---|---|---|
| RAa | CAa | (CAb) | | | 2 | N/A |
| RAb | CAc | | | | 1 | N/A |
| RAc | (CAb) | CAd | CAe | CAf CAg | 5 | ATT1 |
| RAd | (CAb) | CAi | CAj | CAk | 4 | ATT1 |
| RAe | | | | | 0 | ATT1 |
| RAf | (CAb) | CAh | | | 2 | N/A |
| ... | ... | | | | ... | ... |

AET

FIG. 19

| PFRADD | INX | PFCADD | | | EN | ATT |
|---|---|---|---|---|---|---|
| RAa | 0 | CAa | CAb | | 2 | N/A |
| | 1 | CAa | CAb | CAc | 3 | |
| RAb | 0 | CAd | (CAe) | CAf | 3 | N/A |
| | 1 | CAd | CAf | | 2 | |
| ... | | ... | | | ... | ... |

AET

| WRITE BIT | READ BIT | | | |
|---|---|---|---|---|
| 0 | 0 | 1 | 0 | 1 |
| 1 | 0 | 1 | 1 | 0 |

TST1 →
TST2 →

↓ 0-STUCK FAIL CELL
↓ 1-STUCK FAIL CELL
↓ UNKNOWN

METHOD OF CONTROLLING REPAIR OF VOLATILE MEMORY DEVICE AND STORAGE DEVICE PERFORMING THE SAME

CROSS-REFERENCE TO RELATED APPLICATION

This application is based on and claims priority under 35 USC § 119 to Korean Patent Application No. 10-2019-0088724, filed on Jul. 23, 2019, in the Korean Intellectual Property Office (KIPO), the disclosure of which is incorporated by reference herein in its entirety.

BACKGROUND

1. Field

Example embodiments relate generally to semiconductor integrated circuits, and more particularly to a method of controlling repair of a volatile memory device and an apparatus performing the method.

2. Discussion of the Related Art

Semiconductor memory devices may be classified into non-volatile memory devices such as a flash memory device and volatile memory devices such as a dynamic random access memory (DRAM) device. The high speed operation and cost efficiency of DRAM provide for their effective use as system memories. Due to the continuing shrinkage in fabrication design rules for DRAM, bit errors in the DRAM memory cells may rapidly increase and yield of the DRAM device may be lowered.

A storage device such as a solid state drive (SSD) based on a flash memory is used widely as mass storage medium of a computing device. The SSD stores data in a nonvolatile memory device such as a flash memory device and uses a volatile memory device such as a DRAM device as a buffer memory to manage various information for controlling the flash memory device. When fault is found during manufacturing processes of the DRAM device, fault or fail cells may be repaired through various repair schemes. However, when the fault occurs after the DRAM device is mounted in the SSD and the product is supplied to a user, i.e., after the SSD is used at a user level, the SSD in addition to the DRAM device may not operate normally.

SUMMARY

One or more example embodiments may provide a method of controlling repair of a volatile memory device to enhance reliability of the volatile memory device.

One or more example embodiments may provide an apparatus having enhanced reliability and lifetime by adopting the method. According to one or more embodiments, the apparatus is a storage device having enhanced reliability and lifetime by adopting a method of controlling repair of a volatile memory.

According to an aspect of the disclosure, there is provided a method of controlling repair of a volatile memory device, the method comprising: performing a patrol read operation repeatedly to identify error position information of one or more errors included in read data from the volatile memory device; obtaining accumulated error information by accumulating the error position information based on the patrol read operation performed repeatedly; identifying error attribute information based on the accumulated error information, the error attribute information indicating correlation between the one or more errors included in the read data and a structure of the volatile memory device; and performing a runtime repair operation with respect to the volatile memory device based on the accumulated error information and the error attribute information.

According to another aspect of the disclosure, there is provided a method of controlling repair of a volatile memory device included in a storage device, the method comprising: performing a patrol read operation repeatedly to identify error position information of one or more errors included in read data from the volatile memory device while the storage device is in an idle mode; storing as accumulated error information, in an accumulated error table, one or more candidate fail row addresses having correctable errors, among entire row addresses of the volatile memory device, and correctable error numbers respectively corresponding to each of the one or more candidate fail row addresses by accumulating the error position information based on the patrol read operation performed repeatedly, each of the correctable error numbers indicating a number of errors in the respective candidate fail row address; identifying error attribute information based on the accumulated error information, the error attribute information indicating correlation between the errors and a structure of the volatile memory device; and performing a post package repair operation with respect to the volatile memory device based on the accumulated error information and the error attribute information.

According to another aspect of the disclosure, there is provided a storage device comprising: a nonvolatile memory device; and a storage controller configured to control an access to the nonvolatile memory device, the storage controller comprising a volatile memory device and a memory controller configured to control an access to the volatile memory device, wherein the memory controller or the volatile memory device includes an error check and correction (ECC) engine configured to perform error detection and correction with respect to access data of the volatile memory device, and wherein the memory controller is configured to: perform a patrol read operation repeatedly to provide error position information of one or more errors included in read data from a volatile memory device regardless of an access read operation to provide data read from the volatile memory device, obtain accumulated error information by accumulating the error position information based on the patrol read operation performed repeatedly, identify error attribute information based on the accumulated error information, the error attribute information indicating correlation between the one or more errors included in the read data and a structure of the volatile memory device, and perform a runtime repair operation with respect to the volatile memory device based on the accumulated error information and the error attribute information.

According to another aspect of the disclosure, there is provided an apparatus comprising: a memory storing one or more instructions; and a processor configured to execute the one or more instructions to: perform a first patrol read operation to read first data from a volatile memory device; identify one or more first errors in the first data read from the volatile memory device based on the first patrol read; store error information corresponding to the identified one or more first errors; perform a second patrol read operation to read second data from the volatile memory device; identify one or more second errors in the second data read from the volatile memory device based on the second patrol read;

accumulate the error information based on the identified one or more second errors; identify error attribute information based on the accumulated error information and structural information corresponding to a structural characteristics of the volatile memory device; and performing a runtime repair operation with respect to the volatile memory device based on the accumulated error information and the error attribute information.

The method and the storage device according to example embodiments may efficiently manage the errors to prevent failure of the volatile memory device, and thus performance and lifetime of the volatile memory device and the storage device may be enhanced.

BRIEF DESCRIPTION OF THE DRAWINGS

Example embodiments of the disclosure will be more clearly understood from the following detailed description taken in conjunction with the accompanying drawings.

FIG. 7 is a diagram illustrating an accumulated error table for a method of controlling repair of a volatile memory device according to example embodiments.

FIG. 16 is a diagram illustrating an example embodiment of an accumulated error table for a method of controlling repair of a volatile memory device according to example embodiments.

FIG. 19 is a diagram illustrating an example embodiment of an accumulated error table for a method of controlling repair of a volatile memory device according to example embodiments.

DETAILED DESCRIPTION OF THE EMBODIMENTS

Figure 1:
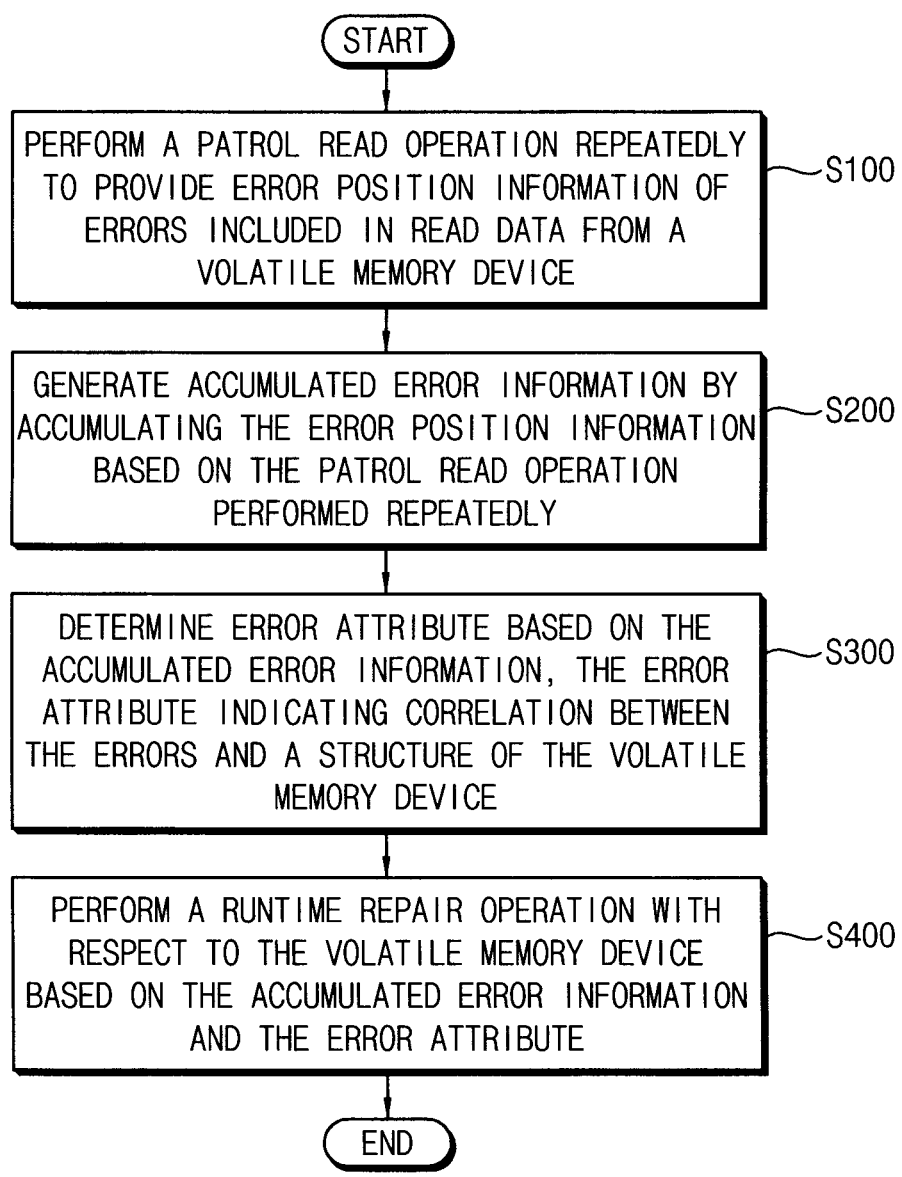
FIG. 1 is a flow chart illustrating a method of controlling repair of a volatile memory device according to example embodiments.

Various example embodiments will be described more fully hereinafter with reference to the accompanying drawings, in which one or more example embodiments are shown. In the drawings, like numerals refer to like elements throughout. The repeated descriptions may be omitted.

FIG. 1 is a flow chart illustrating a method of controlling repair of a volatile memory device according to example embodiments.

Referring to FIG. 1, a patrol read operation is performed repeatedly to provide error position information of errors included in read data from a volatile memory device (S100). The patrol read operation may be performed regardless of an access read operation to provide data read from the volatile memory device to an external device. The patrol read operation may be performed repeatedly with respect to entire row addresses of the volatile memory device.

In S200, accumulated error information is generated by accumulating the error position information based on the patrol read operation performed repeatedly. The accumulated error information may be information that reflects spatial or temporal history of the volatile memory device. According to an embodiment, the accumulated error information may be information that reflects both the spatial and the temporal history of the volatile memory device. The accumulated error information may be stored and managed in an accumulated error table.

In S300, error attribute is determined based on the accumulated error information. According to an embodiment, the error attribute may indicate correlation between the errors and a structure of the volatile memory device. The error attribute may be determined an assigned (or associated) based on distribution of the errors according to a structure of the volatile memory device.

In S400, a runtime repair operation is performed with respect to the volatile memory device based on the accumulated error information and the error attribute. The runtime repair operation indicates an operation to replace an address where the errors occurred with a repair address so that correctable errors that occurred during normal operations of the volatile memory device may not be developed to uncorrectable errors to result in failure of the volatile memory device.

As such, the method and the storage device according to example embodiments may efficiently manage the errors to prevent failure of the volatile memory device, and thus performance and lifetime of the volatile memory device and the storage device may be enhanced.

Figures 2, 3:
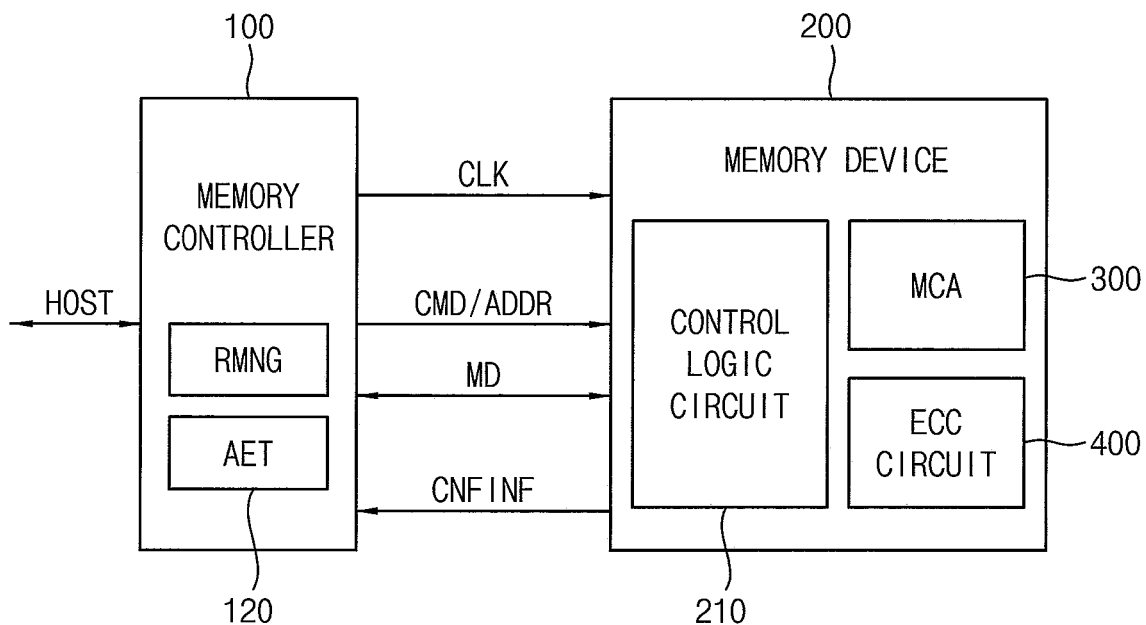
FIG. 2 is a block diagram illustrating a memory system according to example embodiments.
FIG. 3 is a diagram for describing on-die ECC levels according to data bits and parity bits.

FIG. 2 is a block diagram illustrating a memory system according to example embodiments.

Referring to FIG. 2, a memory system 20 includes a memory controller 100 and a volatile memory device 200.

The memory controller 100 may control an overall operation of the memory system 20, and the memory controller 100 may control an overall data exchange between an external host device and the volatile memory device 200. For example, the memory controller 100 may write data in the volatile memory device 200 or read data from the volatile memory device 200 in response to a request from the external host device. In addition, the memory controller 100 may issue operation commands to the volatile memory device 200 for controlling the volatile memory device 200.

In one or more example embodiments, the volatile memory device 200 may be a volatile memory such as a dynamic random access memory (DRAM), a synchronous DRAM (SRAM), a low power double data rate (LPDDR) SRAM, etc. The example embodiments are not limited to a particular type of memory and may be applied to any type of memory requiring repair operations.

The memory controller 100 transmits a clock signal CLK, a command CMD, and an address (signal) ADDR (CMD/ADDR) to the volatile memory device 200 and exchanges data MD with the volatile memory device 200.

The volatile memory device 200 includes a memory cell array (MCA) 300 that stores the data MD, an error correction code or error check and correction (ECC) circuit 400, and a control logic circuit 210. According to an example embodiment illustrated in FIG. 2, the ECC circuit 400 is included in the volatile memory device 200, however, according to another example embodiment, the ECC circuit 400 may be included in the memory controller 100.

The memory system 20 may communicate with an external host device through interface protocols such as Peripheral Component Interconnect-Express (PCI-E), Advanced Technology Attachment (ATA), Serial ATA (SATA), Parallel ATA (PATA), Serial Attached SCSI (SAS), etc.

The memory controller 100 may include a repair manager RMNG configured to perform a method of controlling repair of a volatile memory device according to example embodiments. For instance, the repair manager RMNG may be configured to perform the method of FIG. 1. That is, the repair manager RMNG may control the patrol read operation, generate the accumulated error information and determine the error attribute. The runtime repair operation may be controlled by the repair manager RMNG or by the external host device. In one or more example embodiments, the repair manager RMNG may store and manage the accumulated error information in an accumulated error table AET 120. According to an example embodiment illustrated in FIG. 2, the accumulated error table 120 is included in the memory controller 100, however, other example embodiments are not limited thereto.

In one or more example embodiments, the volatile memory device 200 may provide information CNFINF on its configuration to the memory controller 100. In this case, the repair manager RMNG in the memory controller 100 may determine the error attribute based on the information CNFINF provided from the volatile memory device 200.

FIG. 3 is a diagram for describing on-die ECC levels according to data bits and parity bits.

In FIG. 3, SEC represents single error correction, DED represents double error detection, and DEC represents double error correction. FIG. 3 illustrates parity bits and corresponding size overheads of the parity bits (PARITY O/H). The parity bits correspond to a Hamming code or an extended Hamming code. The size overhead of the parity bits correspond to a ratio of the parity bits of the parity data corresponding to the write data to the data bits of the write data. The cases in FIG. 3 are non-limiting examples. For example, the parity bit number and the size overhead may be determined differently if Bose-Chaudhuri-Hocquenghem (BCH) code, Reed-Solomon code, etc. are used.

As illustrated in FIG. 3, as the parity bit number is increased with respect to the same data bit number, e.g., as the ratio of the parity bit number to the data bit number is increased, a capability of error detection and correction is increased. As the data bit number is increased with respect to the same capability of error detection and correction, the corresponding parity bit number is increased but the ratio of the parity bit number to the data bit number is decreased.

As such, the error detection capability and/or the error correction capability may be increased as the ratio of the parity bit number to the corresponding data bit number is increased. As a result, the on-die ECC level may be increased as the ratio of the parity bit number to the corresponding data bit number is increased. However, the error correction capability is limited because the real memory capacity is decreased as the parity bit number is increased.

According to example embodiments, the failure of the volatile memory device may be prevented by performing the runtime repair operation based on the accumulated error information and the error attribute with a relatively low error correction capability. Here, the failure of the volatile memory device indicates that an error uncorrectable by the ECC function is occurred in the volatile memory device.

Figure 4:
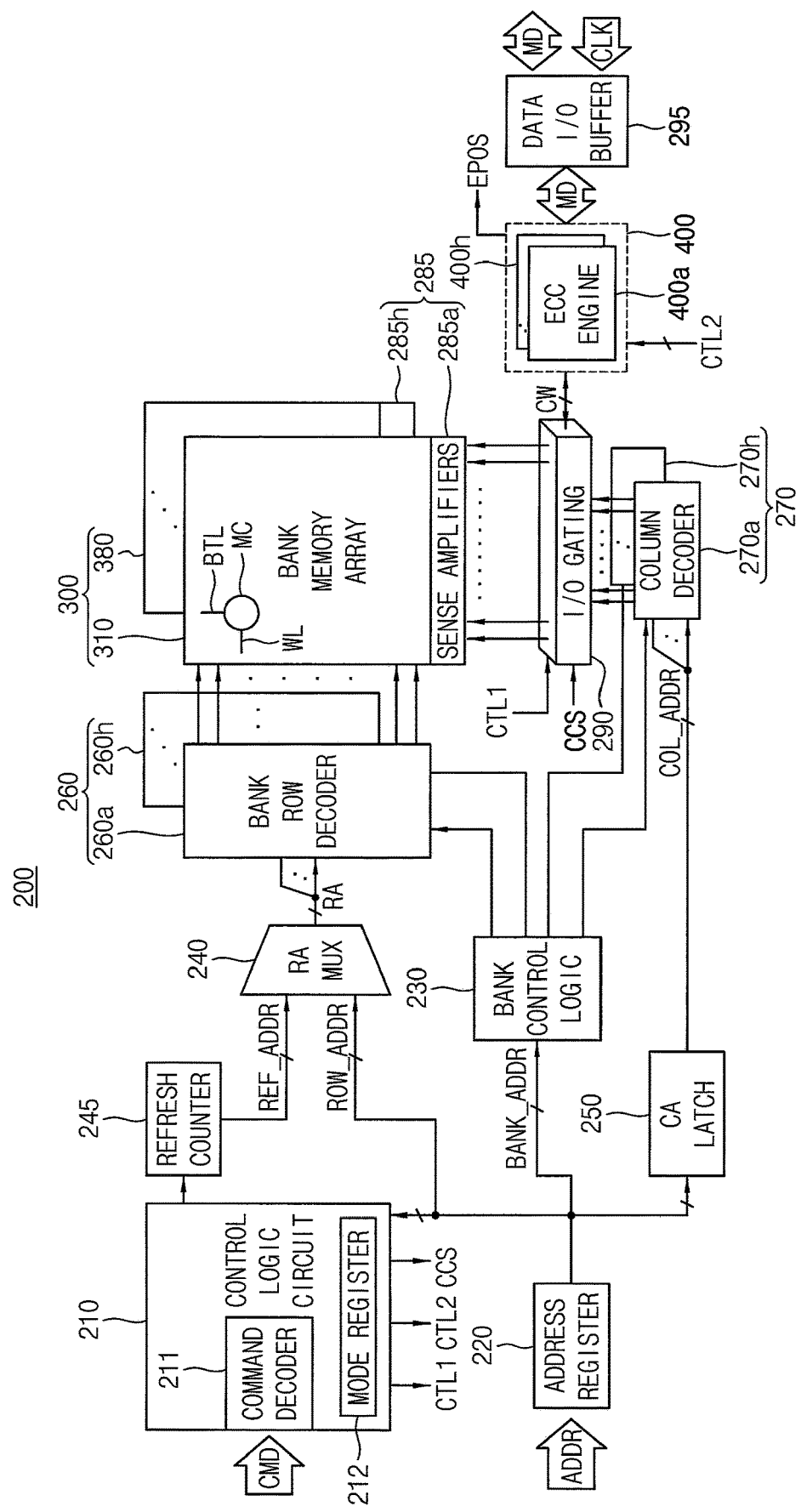
FIG. 4 is a block diagram illustrating a volatile memory device according to example embodiments.

FIG. 4 is a block diagram illustrating a volatile memory device according to example embodiments.

Referring to FIG. 4, a volatile memory device 200 may include a control logic circuit 210, an address register 220, a bank control logic 230, a refresh counter 245, a row address multiplexer 240, a column address latch 250, a row decoder 260, a column decoder 270, the memory cell array 300, a sense amplifier unit 285, an I/O gating circuit block 290, the ECC circuit 400, and a data I/O buffer 295.

The ECC circuit 400 includes first through eighth ECC engines 400a~400h, and the I/O gating circuit block 290 includes a plurality of I/O gating circuits corresponding to a plurality of bank arrays.

The memory cell array 300 includes first through eighth bank arrays 310~380. The row decoder 260 includes first through eighth bank row decoders 260a~260h respectively coupled to the first through eighth bank arrays 310~380, the column decoder 270 includes first through eighth bank column decoders 270a~270h respectively coupled to the first through eighth bank arrays 310~380, and the sense amplifier unit 285 includes first through eighth bank sense amplifiers 285a~285h respectively coupled to the first through eighth bank arrays 310~380. The first through eighth bank arrays 310~380, the first through eighth bank row decoders 260a~260h, the first through eighth bank column decoders 270a~270h, and the first through eighth bank sense amplifiers 285a~285h may form first through eighth banks. Each of the first through eighth bank arrays 310~380 includes a plurality of memory cells MC formed at intersections of a plurality of word-lines WL and a plurality of bit-line BTL.

The address register 220 receives the address ADDR including a bank address BANK_ADDR, a row address ROW_ADDR, and a column address COL_ADDR from the memory controller 100. The address register 220 provides the received bank address BANK_ADDR to the bank control logic 230, provides the received row address ROW_ADDR to the row address multiplexer 240, and provides the received column address COL_ADDR to the column address latch 250.

The bank control logic 230 generates bank control signals in response to the bank address BANK_ADDR. One of the first through eighth bank row decoders 260a~260h corresponding to the bank address BANK_ADDR is activated in response to the bank control signals, and one of the first through eighth bank column decoders 270a~270h corresponding to the bank address BANK_ADDR is activated in response to the bank control signals.

The row address multiplexer 240 receives the row address ROW_ADDR from the address register 220, and receives a refresh row address REF_ADDR from the refresh counter 245. The row address multiplexer 240 selectively outputs the row address ROW_ADDR or the refresh row address REF_ADDR as a row address RA. The row address RA that is output from the row address multiplexer 240 is applied to the first through eighth bank row decoders 260a~260h.

The activated one of the first through eighth bank row decoders 260a~260h decodes the row address RA that is output from the row address multiplexer 240, and activates a word-line of a bank array corresponding to the row address RA. For example, the activated bank row decoder applies a word-line driving voltage to the word-line corresponding to the row address RA. The column address latch 250 receives the column address COL_ADDR from the address register 220, and temporarily stores the received column address COL_ADDR. In one or more example embodiments, in a burst mode, the column address latch 250 generates column addresses that increment from the received column address COL_ADDR. The column address latch 250 applies the temporarily stored or generated column address to the first through eighth bank column decoders 270a~270h.

The activated one of the first through eighth bank column decoders 270a~270h activates a sense amplifier corresponding to the bank address BANK_ADDR and the column address COL_ADDR through the I/O gating circuit block 290. Each of the I/O gating circuits in the I/O gating circuit block 290 includes circuitry for gating input/output data, and further includes read data latches for storing data that is output from the first through eighth bank arrays 310~380 and write drivers for writing data to the first through eighth bank arrays 310~380.

A codeword CW read from one bank array of the first through eighth bank arrays 310~380 is sensed by a sense amplifier coupled to the one bank array from which the data is to be read, and is stored in the read data latches. The codeword CW stored in the read data latches may be provided to the memory controller 100 via the data I/O buffer 295 after ECC decoding is performed on the codeword CW by a corresponding ECC engine. The data MD to be written in one bank array of the first through eighth bank arrays 310~380 may be provided to the data I/O buffer 295 from the memory controller 100, and written in the one bank array by the write drivers after an ECC encoding is performed on the data MD by a corresponding ECC engine.

The data I/O buffer 295 may provide the data MD from the memory controller 100 to the ECC circuit 400 in a write operation of the volatile memory device 200, based on the clock signal CLK, and may provide the data MD from the ECC circuit 400 to the memory controller 100 in a read operation of the volatile memory device 200.

The ECC circuit 400, in the write operation, generates parity data (e.g., parity bits) based on the main data MD from the data I/O buffer 295, and provides the I/O gating circuit block 290 with the codeword CW including the main data MD and the parity bits. The I/O gating circuit block 290 may write the codeword CW in one bank array.

In addition, the ECC circuit 400, in the read operation, may receive the codeword CW, read from one bank array, from the I/O gating circuit block 290. The ECC circuit 400 may perform an ECC decoding on the data MD based on the parity bits in the codeword CW, may correct a single bit error or double bit error in the data MD, and may provide corrected main data to the data I/O buffer 295. Also the ECC circuit 400 may provide error position information EPOS indicating positions (e.g., addresses) of the errors through the ECC decoding, and the error position information EPOS may be provided to the repair manager RMNG in the memory controller 100.

The control logic circuit 210 may control operations of the volatile memory device 200. For example, the control logic circuit 210 may generate control signals for the volatile memory device 200 to perform a write operation or a read operation. The control logic circuit 210 includes a command decoder 211 that decodes the command CMD received from the memory controller 100 and a mode register 212 that sets an operation mode of the volatile memory device 200. For example, a value of the mode register 212 may indicate the operation mode.

For example, the command decoder 211 may generate the control signals corresponding to the command CMD by decoding a write enable signal (/WE), a row address strobe signal (/RAS), a column address strobe signal (/CAS), a chip select signal (/CS), etc. The control logic circuit 210 may generate a column control signal CCS and a first control signal CTL1 to control the I/O gating circuit block 290 and a second control signal CTL2 to control the ECC circuit 400.

Figure 5:
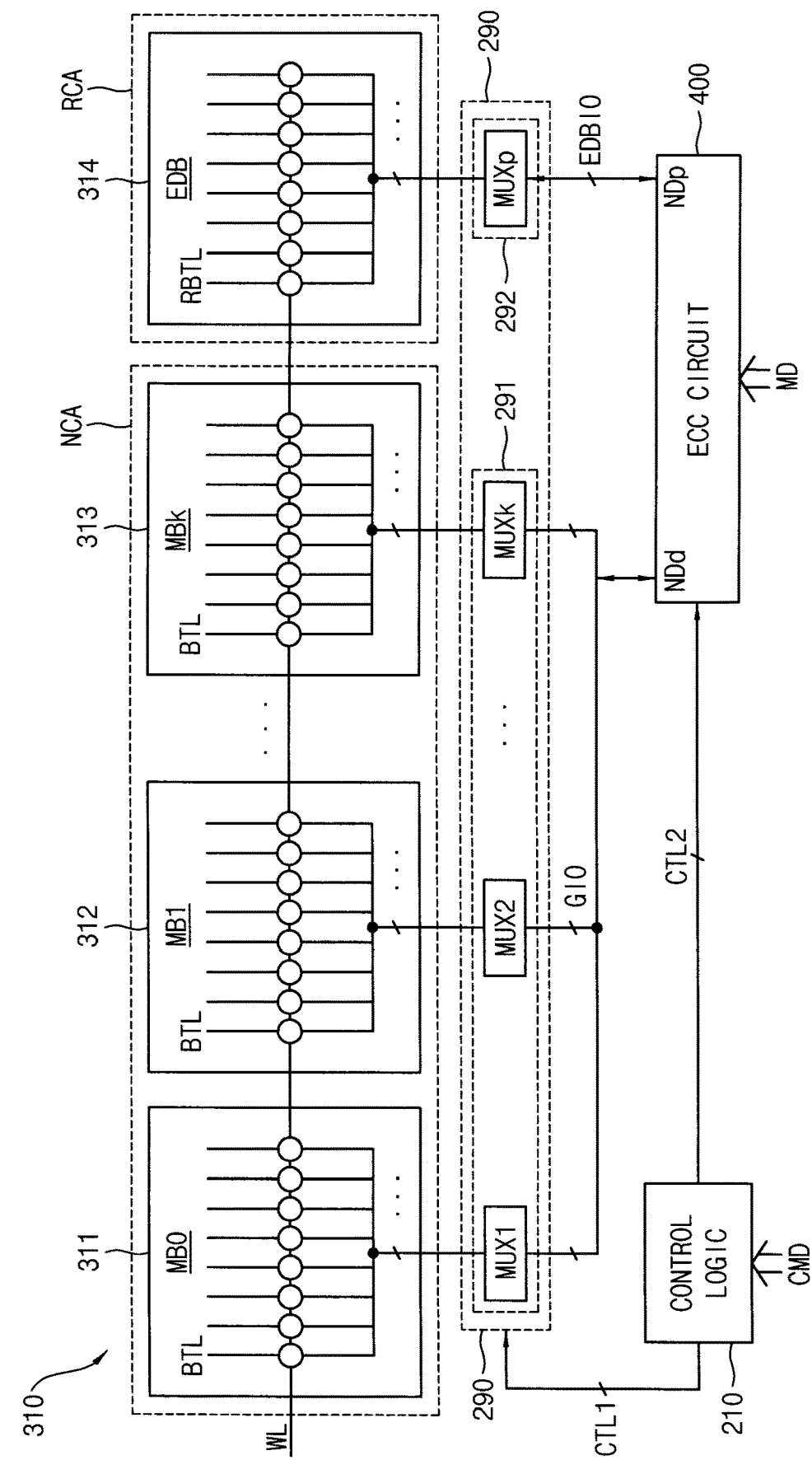
FIG. 5 is a diagram illustrating a portion of the volatile memory device of FIG. 4.

FIG. 5 is a diagram illustrating a portion of the volatile memory device of FIG. 4.

Referring to FIG. 5, a volatile memory device 200a may include the control logic 210, the first bank array 310, the I/O gating circuit 290, and the ECC circuit 400. The first bank array 310 may include a normal cell array NCA and a redundancy cell array RCA. The normal cell array NCA may include a plurality of first memory blocks MB0~MBk, e.g., 311~313, and the redundancy cell array RCA may include at least a second memory block EDB, e.g., 314. The first memory blocks 311~313 are memory blocks determining a memory capacity of the volatile memory device 200a. The second memory block 314 is for ECC and/or redundancy repair. Since the second memory block 314 for ECC and/or redundancy repair is used for ECC, data line repair, or block repair to repair one or more failed cells generated in the first memory blocks 311~313, the second memory block 314 is also referred to as an EDB block.

In each of the first memory blocks 311~313, a plurality of first memory cells are arrayed in rows and columns. In the second memory block 314, a plurality of second memory cells are arrayed in rows and columns. The first memory cells and the second memory cells connected to intersections of the word lines WL and bit lines BTL (for the first memory blocks 311~313) and RBTL (for the second memory block 314) may be dynamic memory cells.

The I/O gating circuit 290 may include a first switching circuit 291 connected to the first memory blocks 311~313 and a second switching circuit connected to the second memory block 314. In the volatile memory device 200a, bit lines corresponding to data of a burst length (BL) may be simultaneously accessed to support the BL indicating the maximum number of column positions that is accessible. For example, the BL may be set to 8. In this case, each of the bit lines BTL and RBTL may be connected to a corresponding one of column selectors MUX1~MUXk and MUXp.

The ECC circuit 400 may be connected to the first and second switching circuits 291 and 292 through first data lines GIO and second data lines EDBIO, respectively. The first data lines GIO may be connected to data nodes NDd of the ECC circuit 400 and the second data lines EDBIO may be connected to parity nodes NDp of the ECC circuit 400.

The control logic circuit 210 may decode the command CMD to generate the first control signal CTL1 for controlling the first and second switching circuits 291 and 292 and the second control signal CTL2 for controlling the ECC circuit 400.

An ECC unit that is an object of each ECC operation may be determined as various combinations of data corresponding to the same row address. If the ECC unit includes errors more than a correctable number, the data may be lost permanently to cause critical damage to a system using the volatile memory device. According to example embodiments, the runtime repair operation may be performed by efficiently managing the correctable errors, before the uncorrectable errors are occurred.

Figure 6A:
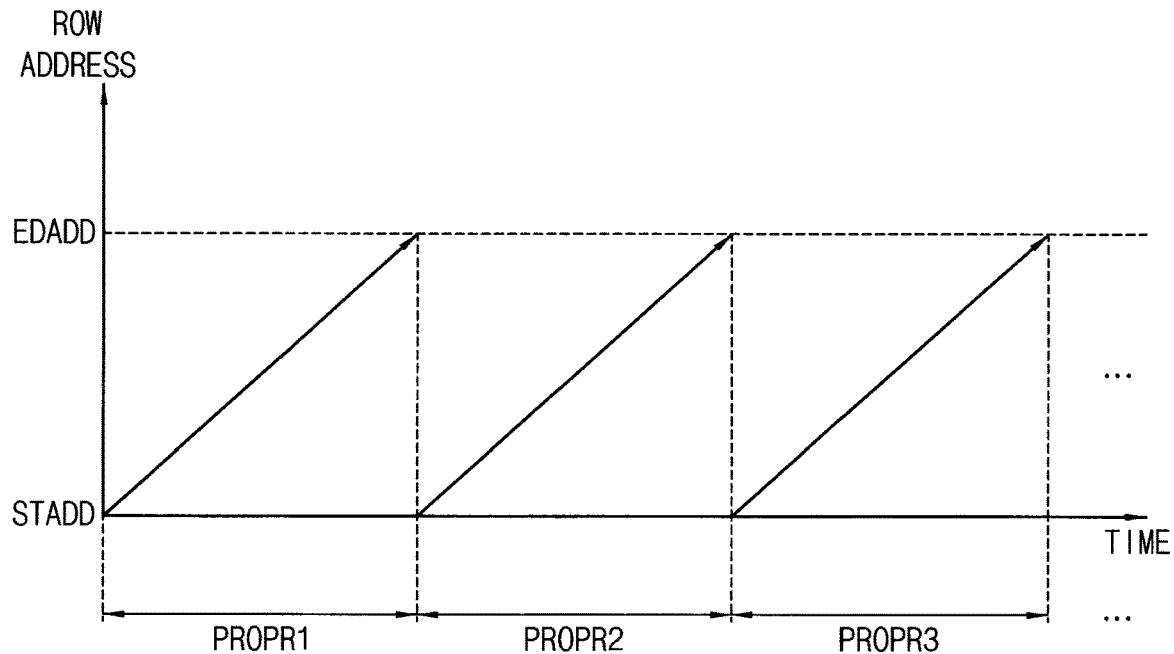
FIGS. 6A and 6B are diagrams illustrating a patrol read operation for a method of controlling repair of a volatile memory device according to example embodiments.
Figure 6B:
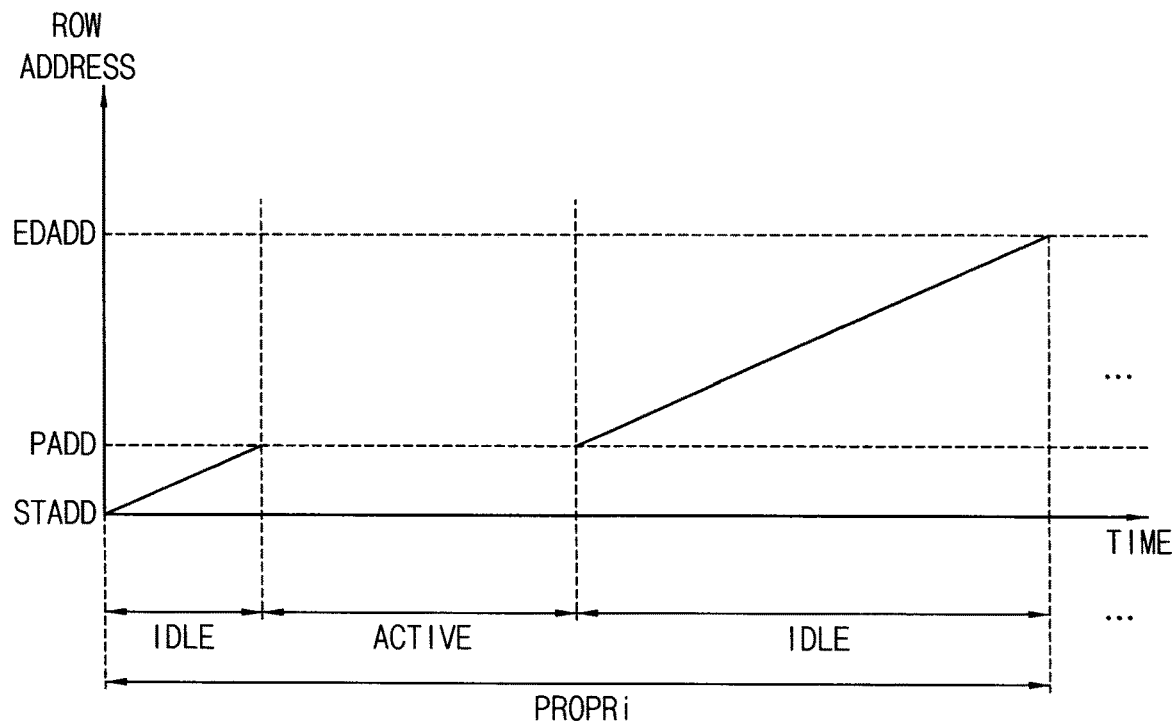

FIGS. 6A and 6B are diagrams illustrating a patrol read operation for a method of controlling repair of a volatile memory device according to example embodiments.

Referring to FIGS. 6A and 6B, a plurality of patrol read operations PROPR1, PROPR2 and PROPR3 may be performed repeatedly. For example, each patrol read operation may be performed from a start row address STADD to an end row address EDADD of entire row addresses of the volatile memory device. FIG. 6A illustrates a non-limiting example that the plurality of patrol read operations PROPR1, PROPR2 and PROPR3 are performed in the same pattern. In some example embodiments, the repeated patrol read operations may be performed in different patterns.

FIG. 6B illustrates timings of the one patrol read operation PROPRi. The patrol read operation may be suspended during an active mode while the access operation to the volatile memory device is performed, and the patrol read operation may be performed only during an idle mode. The pointer PADD indicating the address at which the patrol read operation is suspended may be stored in the repair manager RMNG When the idle mode is resumed, the patrol read operation may be performed continuously based on the stored pointer PADD.

FIG. 7 is a diagram illustrating an example embodiment of an accumulated error table for a method of controlling repair of a volatile memory device according to example embodiments.

An accumulated error table may be generated and managed with respect to each of a plurality of memory banks. FIG. 7 illustrates, as an example, three accumulated error tables AET1, AET2 and AET3 corresponding to three memory banks, including a detailed illustration of an example of the accumulated error information stored in the one accumulated error table AET1.

The repair manager RMNG may store, in the accumulated error table AET1, candidate fail row addresses (PFRADD) RAa~RAf having correctable errors among entire row addresses of the volatile memory device and correctable error numbers (EN) 2, 1, 5, 4, 0 and 2 respectively corresponding to the candidate fail row addresses RAa~RAf. For example, FIG. 7 shows that the correctable error number of the candidate fail row address RAa is 2, the correctable error number of the candidate fail row address Rad is 4, and the like. That is, the correctable error number EN is the number of errors in the candidate fail row address that are correctable. ATT indicates the above-described error attribute. N/A indicates that the error attribute is not determined and assigned to the corresponding candidate fail row address. FIG. 7 shows an example that one error attribute ATT1 is assigned to (or associated with) the candidate fail row addresses RAc, RAd and RAe. The candidate fail row address RAe to which the error attribute is assigned may have the correctable error number of zero. In other words, the row address may be included in the accumulated error table if the error attribute is assigned to the row address even though the row address has no error, which will be described below with reference to FIGS. 13 through 15.

Figure 8:
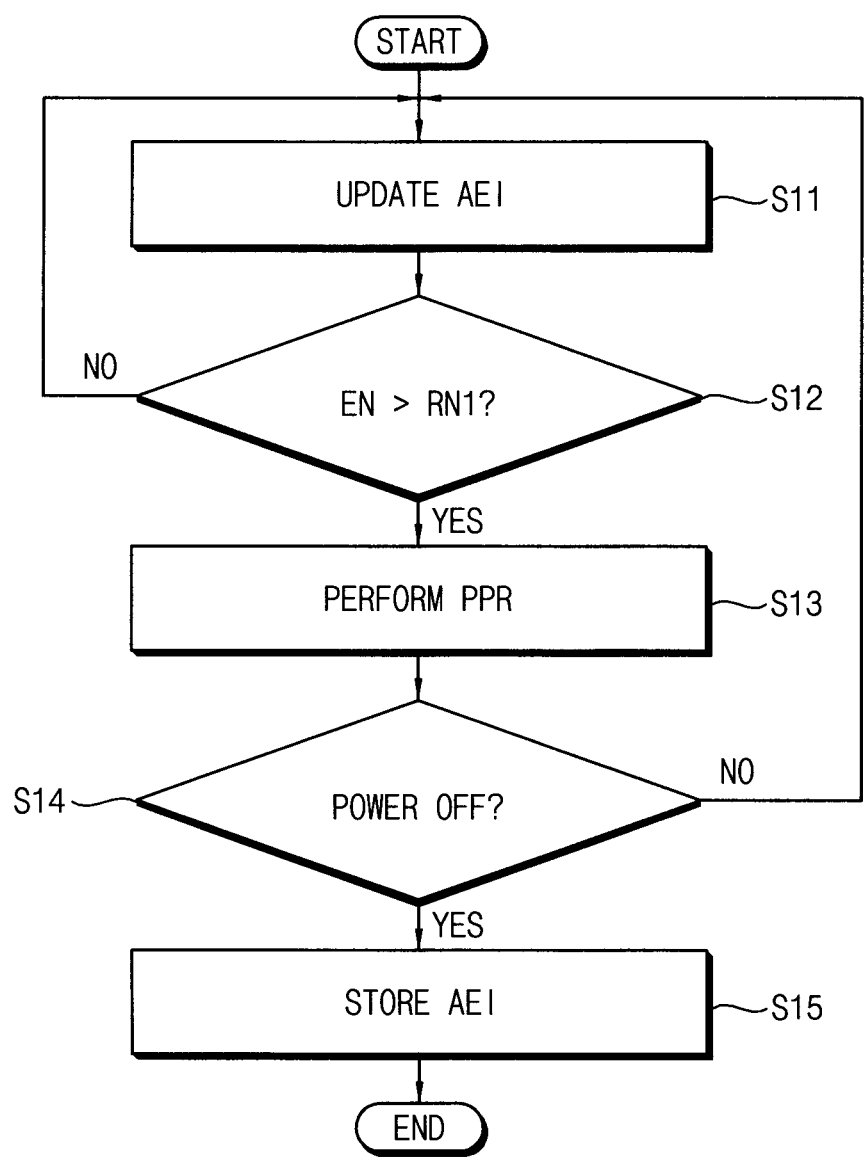
FIG. 8 is a flow chart illustrating a method of controlling repair of a volatile memory device according to example embodiments.

FIG. 8 is a flow chart illustrating a method of controlling repair of a volatile memory device according to example embodiments.

Referring to FIG. 8, the accumulated error information AEI may be updated (S11) whenever the patrol read operation is performed once. It is determined whether the correctable error number EN is greater than a reference error number RN1 with respect to each of the candidate fail row addresses included in the accumulated error information AEI (S12), When the correctable error number EN of at least one of the candidate fail row addresses is greater than the reference error number RN1 (S12:YES), the post package repair operation is performed (S13) with respect to all of the candidate fail row addresses corresponding to the correctable error numbers EN greater than the reference error number RN1. When the correctable error numbers EN of all the candidate fail row addresses is not greater than the reference error number RN1 (S12:NO), the patrol read operation is performed again to update the accumulated error information AEI and it is determined again whether the post package repair operation is required based on the updated accumulated error information AEI.

Such a sequence of the operations may be repeated until the volatile memory device is powered off (S14:NO). The accumulated error information AEI and the error attribute may be stored in a nonvolatile memory device (S15) when the volatile memory device is powered off. The accumulated error information AEI and the error attribute may be loaded from the nonvolatile memory device to the volatile memory device when the volatile memory device is powered on again so that the method of controlling repair of a volatile memory device according to example embodiments may be performed continuously even though the volatile memory device is powered off.

Figure 9:
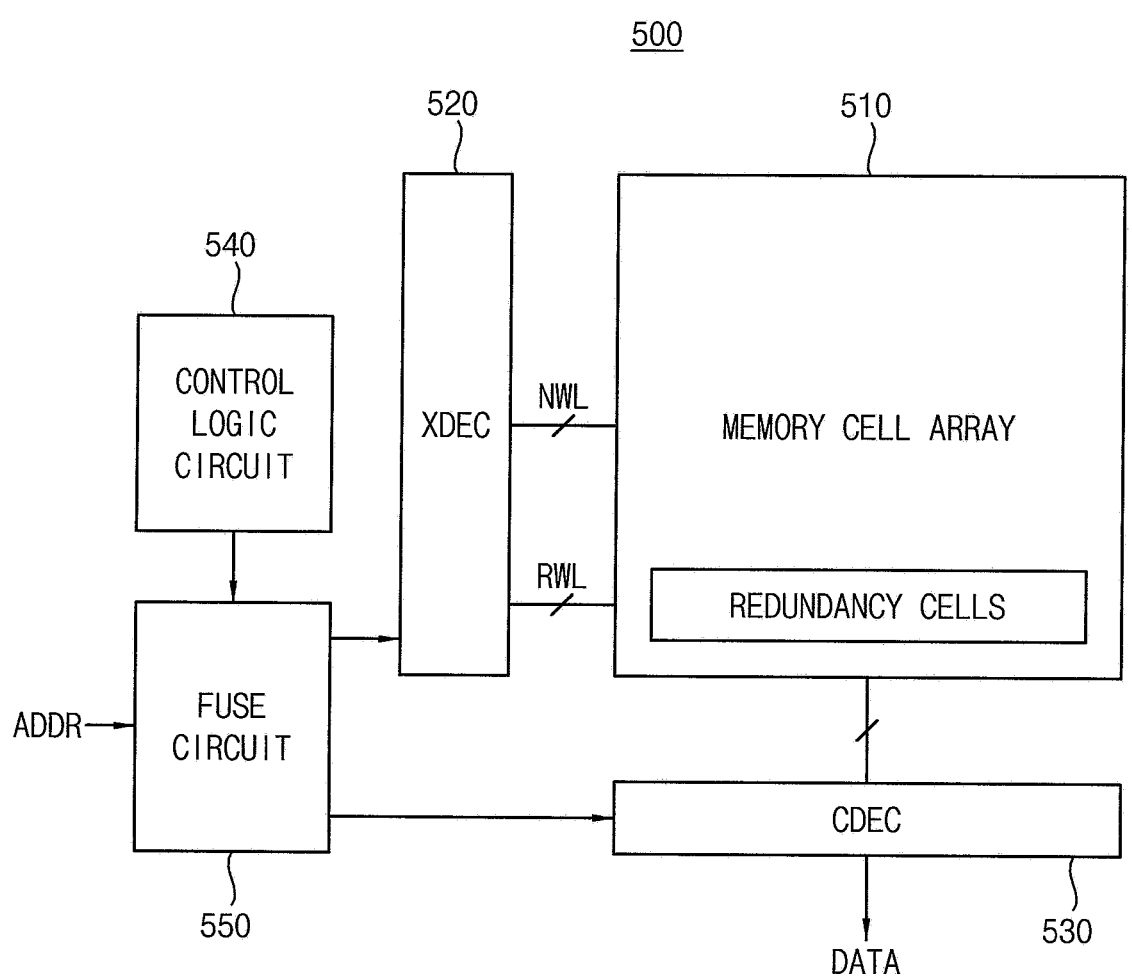
FIG. 9 is a block diagram illustrating a volatile memory device performing a post package repair operation according to example embodiments.

FIG. 9 is a block diagram illustrating a volatile memory device performing a post package repair operation. For convenience of illustration and description, only components for describing the post package repair operation are illustrated.

Referring to FIG. 9, a DRAM device 500 may include a memory cell array 510, a row decoder (XDEC) 520, a column decoder (CDEC) 530, a control logic circuit 540 and a fuse circuit 550.

The memory cell array 510 may include a plurality of DRAM cells. The DRAM cells may be connected to wordlines NWL and RWL and bit lines, respectively. A portion of the DRAM cells may be normal cells and another portion of the DRAM cells may be redundancy cells for replacing the fail cells among the normal cells.

The row decoder 520 may be connected to the memory cell array 510 through the wordlines NWL and RWL. The row decoder 520 may select one of the wordlines based on an address ADDR (that is, a row address in the address ADDR), and control a voltage of the selected wordline.

The column decoder 530 may be connected to the memory cell array 510 through the bitlines. The column decoder 530 may select a portion of the bitlines based on the address ADDR (that is, a column address in the address ADDR), and control or detect voltages of the selected bitlines.

The control logic circuit 540 may control an overall operation of the DRAM device 500. A fuse setting operation may be performed under control of the control logic circuit 540. The control logic circuit 540 may be configured to reset the fuse-setting of the fuse circuit 550 by the runtime repair operation. The normal cells may be replaced with the redundancy cells through the fuse-setting of the fuse circuit 550. For example, the fuse circuit 550 may receive the address ADDR from the memory controller. When the row address in the address ADDR corresponds to the normal wordline NWL that is determined as the fail wordline, the fuse circuit 550 may output a repair address so that the row decoder 520 may select the redundancy wordline RWL instead of the normal wordline NWL.

In other words, the fuse circuit 550 may change the fuse-setting so that the row address corresponding to the fail address may be converted to the repair address. The row decoder 520 may select the redundancy wordline RWL based on the repair address from the fuse circuit 550. The fuse circuit 550 may transfer the row address that does not correspond to the fail address to the row decoder 520 without conversion.

As such, the DRAM device 500 may perform the post package repair operation with respect to the fail address through the electrical fuse-setting of the fuse circuit 550.

Figure 10:
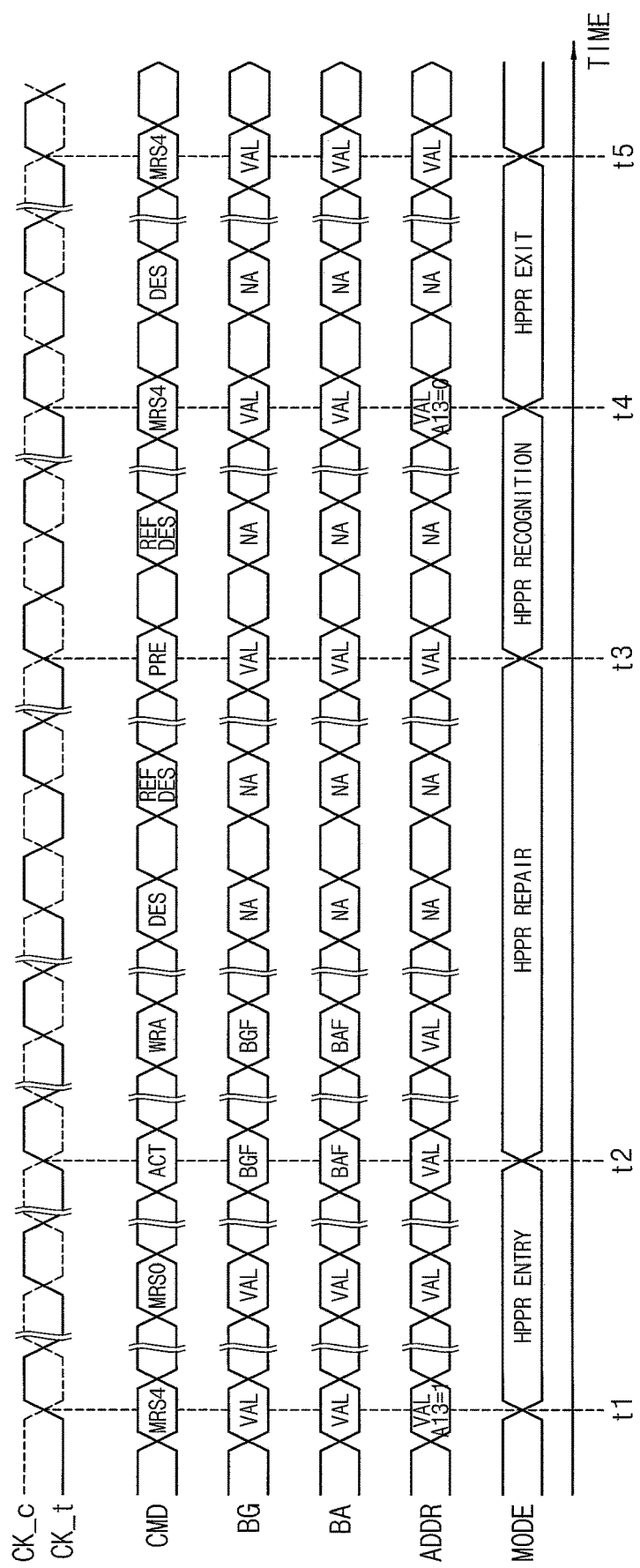
FIG. 10 is a timing diagram illustrating signals for the post package repair operation.

FIG. 10 is a timing diagram illustrating signals for the post package repair operation.

For example, the runtime repair operation may be performed based on a hard post package repair (hPPR). In response to signals in a timing diagram of FIG. 10, the electrical fuse-setting of the fuse circuit 550 in FIG. 10 may be performed.

Referring to FIG. 10, during time point t1 through time point t2, the DRAM device may enter an hPPR mode in response to mode register set commands MRS4, MRS0 provided from the memory controller. For example, the value of the address bit A13 may be set to "1" indicating the activation of the hPPR operation. In one or more example embodiments, before entering the hPPR mode, the data stored in a memory bank including the fail row may be flushed to a nonvolatile memory device. In addition, before entering the hPPR mode, all memory banks of the DRAM device may be precharged.

During time point t2 through time point t3, the DRAM device may perform the hPPR operation in response to an active command ACT, an automatic precharge write command WRA and address signals BGF and BAF. For example, the address signals BGF and BAF may correspond to the fail rows. The hPPR operation may be performed through the electrical fuse-setting of the fuse circuit 550 as described with reference to FIG. 9.

During time point t3 through time point t4, the DRAM device may perform an hPPR recognition in response to a precharge command PRE, and during time point t4 through time point t5, The DRAM device may exit from the hPPR mode in response to the mode register set command MRS4 and the value "0" of the address bit A13. After exiting the hPPR mode, the DRAM device may restore the data based on the flushed data in the nonvolatile memory device.

FIG. 10 illustrates a non-limiting example of a direct repair, and example embodiments are not limited thereto. In some example embodiments, the hPPR operation may be performed using a normal write command WR instead of the automatic precharge write command WRA. In this case, backup or flushing of the data stored in all memory banks of the DRAM device may be performed before entering the hPPR mode. Alternatively, the direct repair may be performed based on a soft post package repair (sPPR).

Figure 11:
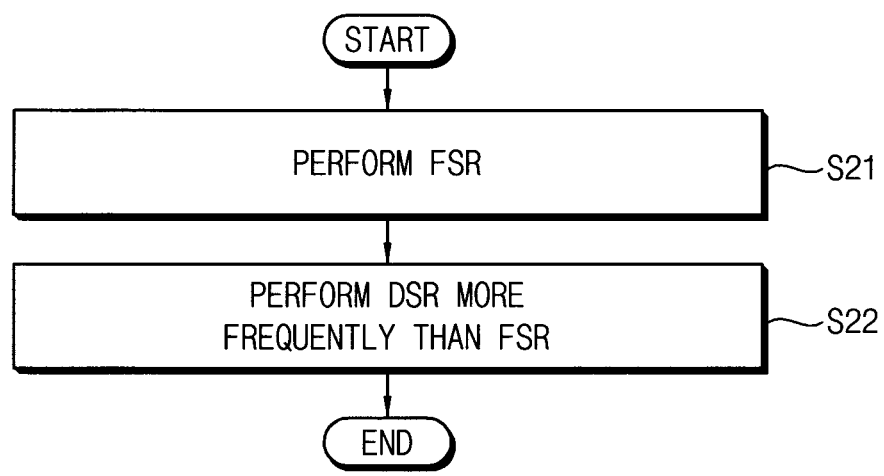
FIGS. 11 and 12 are diagrams illustrating a patrol read operation for a method of controlling repair of a volatile memory device according to example embodiments.
Figure 12:
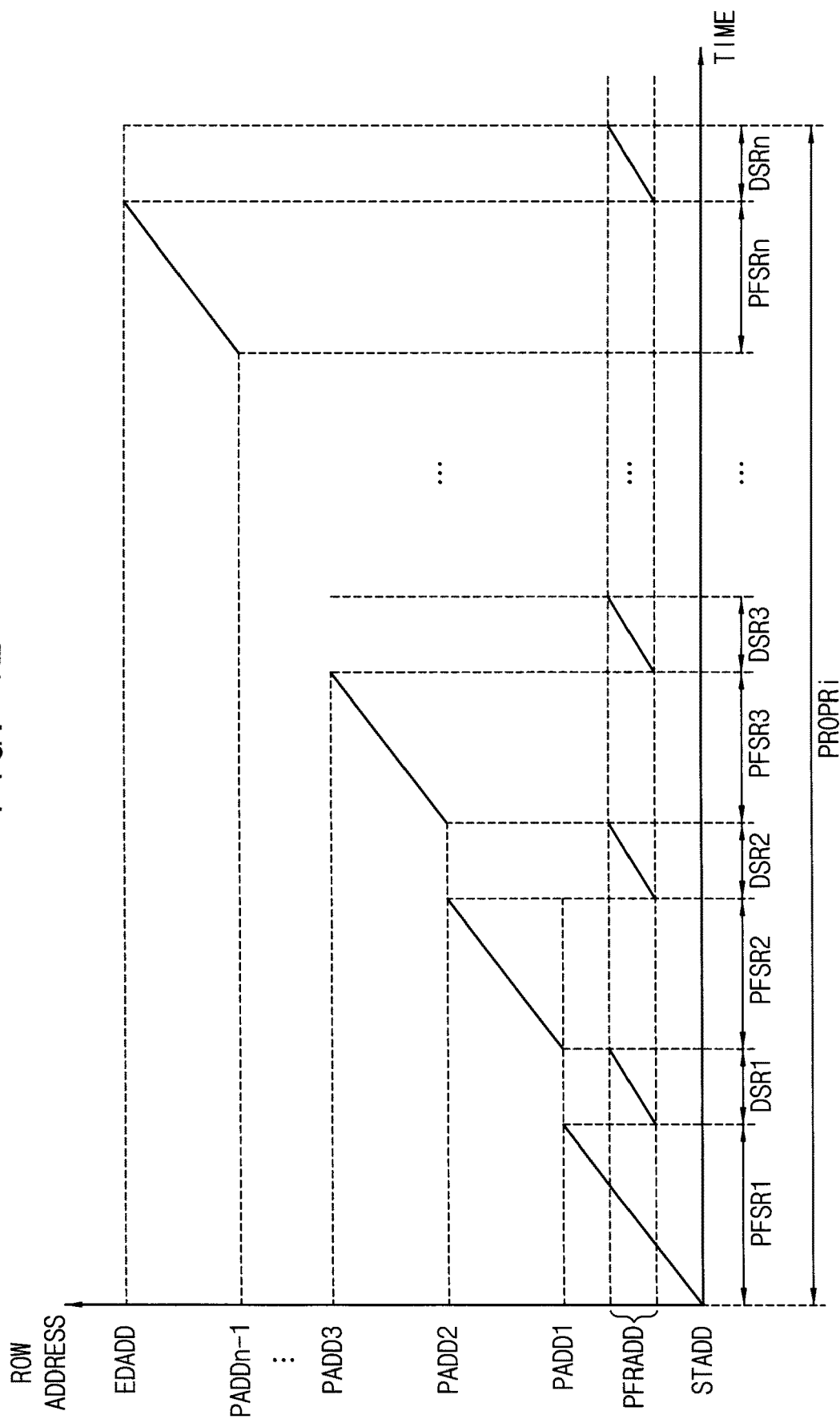

FIGS. 11 and 12 are diagrams illustrating a patrol read operation for a method of controlling repair of a volatile memory device according to example embodiments.

Referring to FIG. 11, a full scanning read operation FSR may be performed sequentially with respect to the entire row addresses of the volatile memory device (S21). Also a deep scanning read operation DSR may be performed sequentially with respect to the candidate fail row addresses included in the accumulated error table more frequently than the full scanning read operation FSR. In other words, the deep scanning read operation DSR is performed two or more times while the full scanning read operation FSR is performed once. As such, monitoring through the patrol read operation may be enforced with respect to the candidate fail row addresses that have the errors or higher probability of future errors, and the failure of the volatile memory device may be further prevented.

FIG. 12 illustrates, as an example, one patrol read operation PROPRi including one full scanning read operation FSR and a plurality of deep scanning read operations DSR1~DSRn. The one full scanning read operation FSR may be divided into a plurality of part scanning read operations PFSR1~PFSRn). Each of the deep scanning read operations DSR1~DSRn may start whenever the full scanning read operation arrives at an intermediate row address among row addresses PADD1~PADDn−1. According to an example embodiment, FIG. 12 illustrates that the candidate fail row addresses PFRADD for the scanning read operation are adjacent in one address region for convenience of illustration, the candidate fail row addresses PFRADD may be distributed irregularly over the entire row addressed between the start row address STADD to the end row address EDADD.

As a result, the deep scanning read operation may be performed multiple times corresponding to the candidate fail row addresses PFRADD (n+1) while the full scanning read operation is performed once with respect to the other row addresses.

Figure 13:
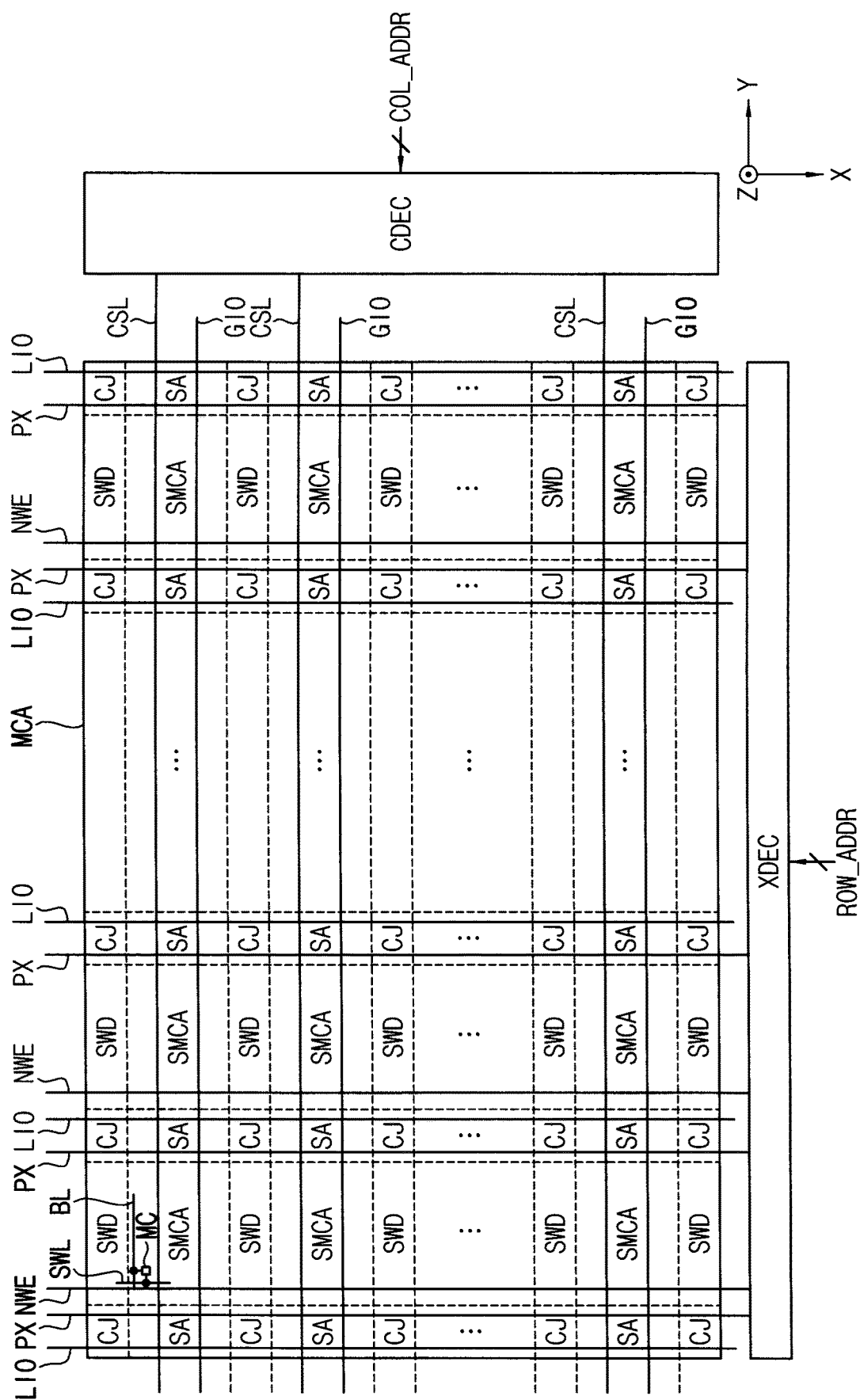
FIG. 13 is a diagram illustrating an example layout of a memory cell array included in a volatile memory device according to example embodiments.

FIG. 13 is a diagram illustrating an example layout of a memory cell array included in a volatile memory device according to example embodiments.

FIG. 13 illustrates a memory cell array region MCA, a column decoder CDEC, and a row decoder XDEC and other components of the volatile memory device are omitted for convenience of illustration. The memory cell array region MCA includes a dual wordline structure including a main wordline NWE and a plurality of sub wordlines SWL, conjunction regions CJ, sub wordline driver regions SWD, sense amplifier regions SA and sub memory cell array regions SMCA.

In one or more example embodiments, word selection signal lines PX, main wordlines NEW, sub wordlines SWL, column selection signal lines CSL, local input-output data lines LIO and global input-output data lines GIO may be formed in an upper portion of the memory cell array region MCA. The power lines are omitted in FIG. 13 for convenience of illustration.

In the memory cell array region MCA, the conjunction regions CJ, the sub wordline driver regions SWD, the sense amplifier regions SA and the sub memory cell array regions SMCA are disposed repeatedly in the row direction X and the column direction Y. The memory cells MC are formed in the sub memory cell array regions SMCA and connected to the sub wordlines SWL and the bitlines BL. The data may be written to or read from the memory cells MC in response to the signals transferred through the word selection signal lines PX, the main wordlines NWE and the column selection signal lines CSL.

The column decoder CDEC generates signals on column select signal lines CSL to select one or more columns of the array for reading or writing according to a supplied column address COL_ADDR. The row decoder XDEC decodes the row address ROW_ADDR to generate signals for selecting one of the main wordlines NWE and signals for selecting one of the word line selection lines PX.

The main wordlines NWE extend in the row direction X on the sub wordline driver regions SWD and the sub memory cell array regions SMCA, and the word selection signal lines PX and the local input-output data lines LIO extend in the row direction X on the conjunction regions CJ and the sense amplifier regions SA. The column selection signal lines CSL and the global input-output data lines GIO extend in the column direction Y on the sense amplifier regions SA and the sub memory cell array regions SMCA.

Figure 14:
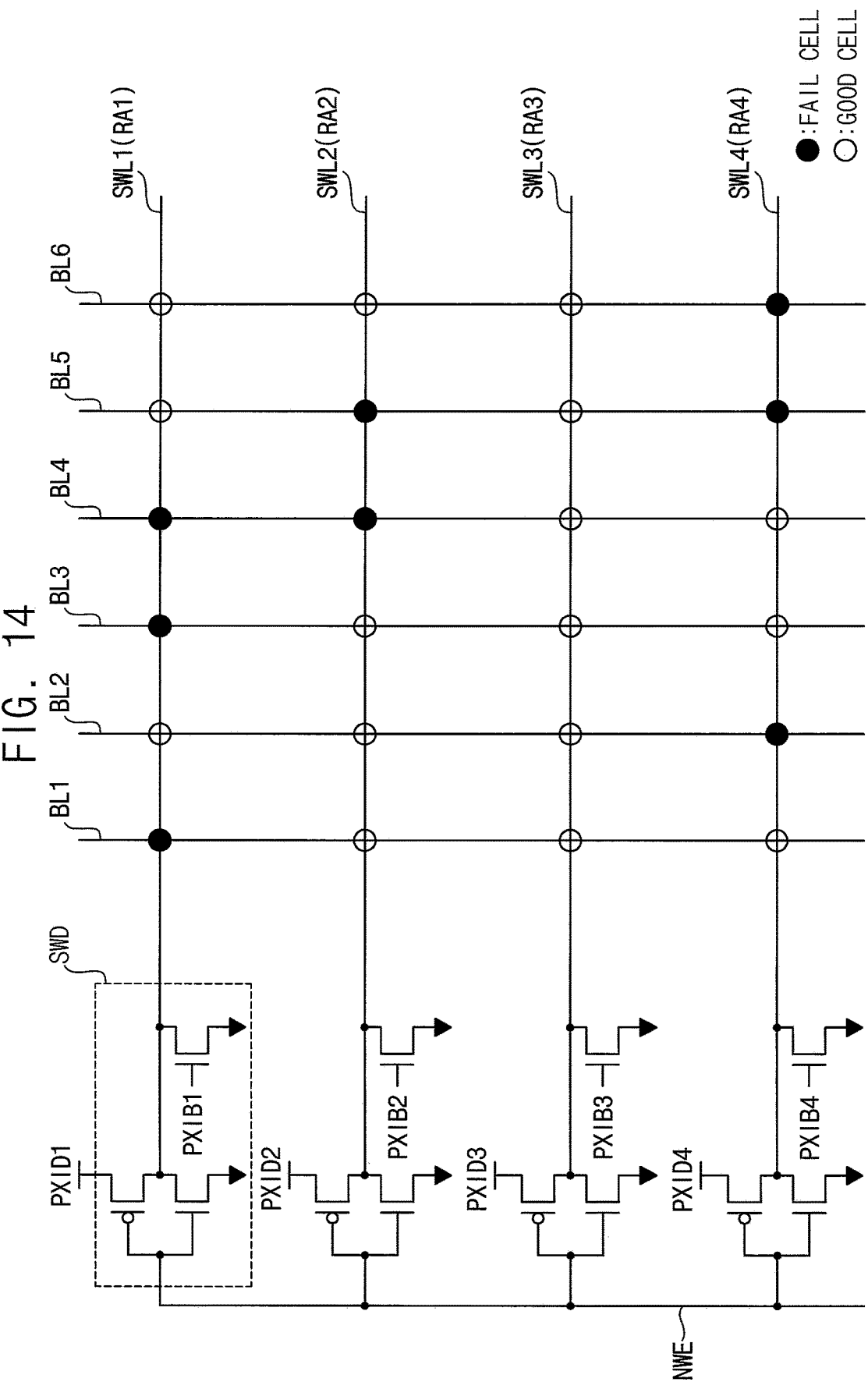
FIGS. 14 and 15 are diagrams for describing example embodiments of determining error attribute for a method of controlling repair of a volatile memory device according to example embodiments.
Figure 15:
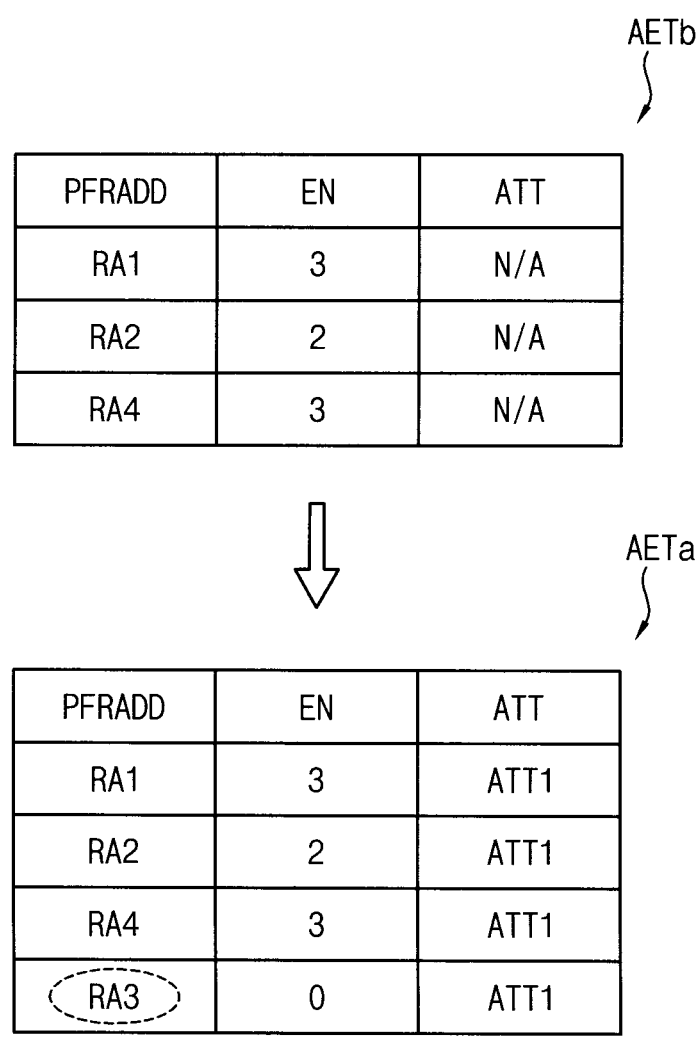

FIGS. 14 and 15 are diagrams for describing example embodiments of determining error attribute for a method of controlling repair of a volatile memory device according to example embodiments.

FIG. 14 illustrates an example that a plurality of sub wordlines SWL1~SWL4 are connected to one main wordline NWE through sub wordline drivers SWD. Signals PXID1~PXID4 and PXIB1~PXIB4 are generated by address decoding.

The sub wordlines SWL1~SWL4 connected to the same main wordline NWE have a structural correlation. For example, when a fault is occurred in the main wordline NWE or in a driver that drives the main wordline NWE, the number of the sub wordlines having the errors or the sum of errors in the sub wordlines SWL1~SWL4 may be increased. In the example case illustrated in FIGS. 14 and 15, the error number of the sub wordline SWL3 is zero, but the sub wordline SWL3 may be rapidly susceptible to the failure. To prevent such possibility of the failure, the error attribute may be assigned to an address group including the row addresses RA1~RA4 corresponding to all of the sub wordlines SWL1~SWL4 connected to the same main wordline NWE, and the address group RA1~RA4 may be stored in the accumulated error table as the candidate fail row addresses.

In one or more example embodiments, the post package repair operation may be performed with respect to all of the row addresses RA1~RA4 included in the address group when a sum of the correctable error numbers of the address group is greater than a risk error number. In other words, the post package repair operation may be performed with respect to the row address RA3 having no error.

In FIG. 15, AETb indicates the accumulated error table before determining the error attribute ATT1, and AETa indicates the accumulated error table after determining the error attribute ATT1. Accordingly, according to an embodiment, the accumulated error table may be generated or modified based on the error attribute determination.

In one or more example embodiments, main address error attribute may be determined with respect to the address group including row addresses of a plurality of sub wordlines corresponding to a main wordline of the volatile memory device when a number of the candidate fail row addresses included in the address group is greater than a reference number. In the example of FIGS. 14 and 15, the number of the candidate fail row addresses corresponds to three and the reference number is assumed to be two.

In one or more example embodiments, the main address error attribute may be determined with respect to the address group including row addresses of a plurality of sub wordlines corresponding to a main wordline of the volatile memory device when a sum of the correctable error numbers corresponding to all of the row addresses included in the address group. In the example of FIGS. 14 and 15, the sum of the correctable error number corresponds to eight and the reference error number is assumed to be seven.

FIG. 16 is a diagram illustrating an example embodiment of an accumulated error table for a method of controlling repair of a volatile memory device according to example embodiments.

In one or more example embodiments, the repair manager RMNG may store, in the accumulated error table AET, candidate fail column addresses having the correctable errors with respect to each of the candidate fail row addresses.

In comparison with the accumulated error table AET1 of FIG. 7, the accumulated error table AET of FIG. 16 may further include the candidate fail column addresses CAa~CAk with respect to each of the candidate fail row addresses RAa~ARf.

In this case, column error attribute may be determined with respect to each candidate fail column address when a number of the candidate fail row addresses including the each candidate fail column address is greater than a reference number.

In the example of FIG. 16, the number of the candidate fail row addresses RAa, RAc, RAd and RAf including the same candidate fail column address CAb is four. If the reference error number is set to be three, the column error attribute may be assigned to the candidate fail column address Cab. The post package repair operation may be performed with respect to the candidate fail column address Cab to which the column error attribute is assigned, as will be described with reference to FIGS. 17 and 18.

Figure 17:
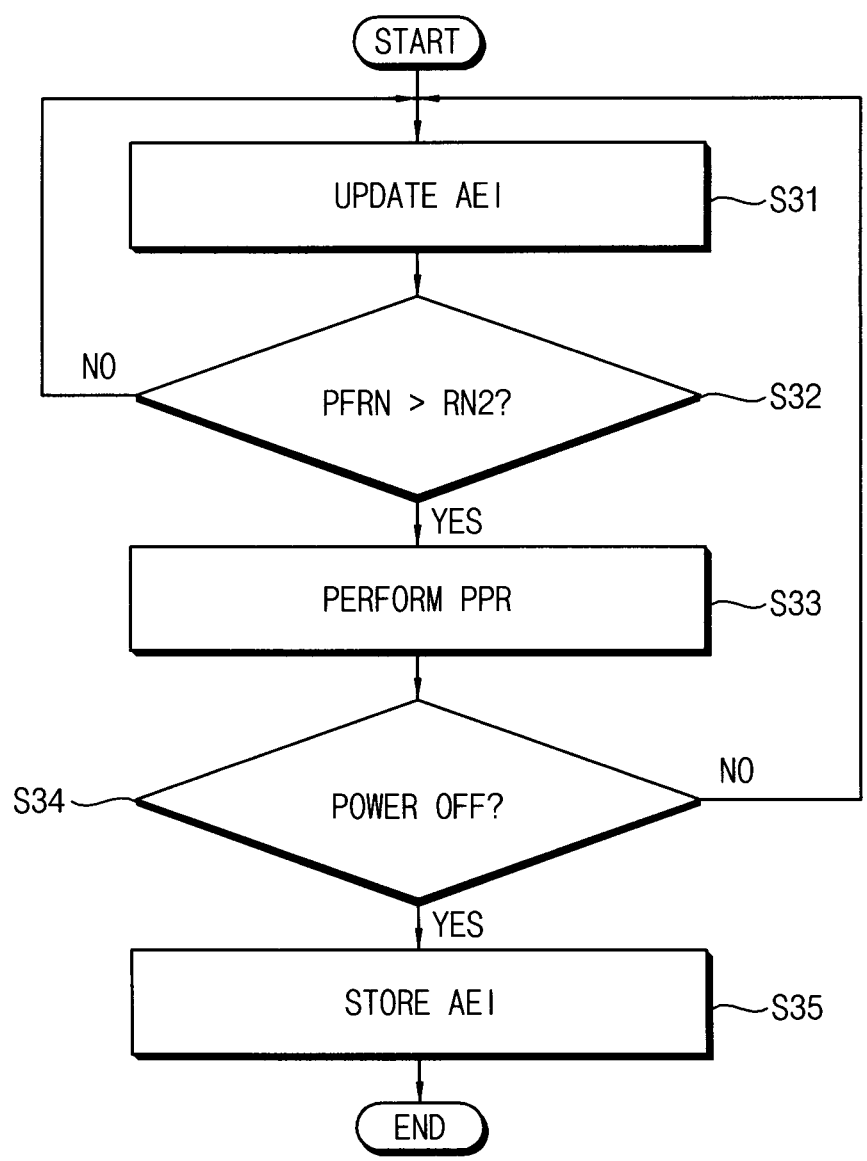
FIG. 17 is a flow chart illustrating a method of controlling repair of a volatile memory device according to example embodiments.
Figure 18:
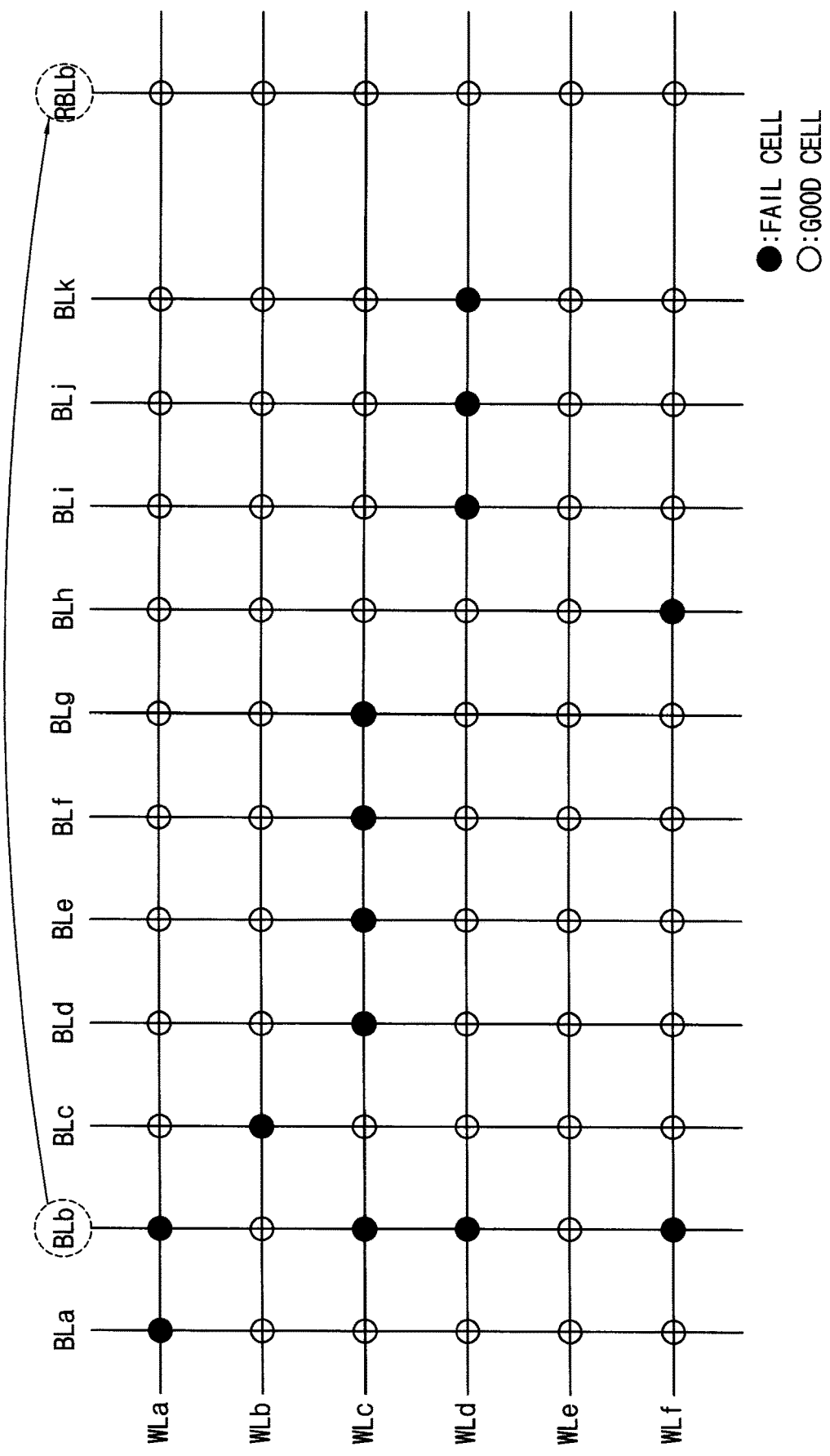
FIG. 18 is a diagram illustrating column repair by a method of controlling repair of a volatile memory device according to example embodiments.

FIG. 17 is a flow chart illustrating a method of controlling repair of a volatile memory device according to example embodiments, and FIG. 18 is a diagram illustrating column repair by a method of controlling repair of a volatile memory device according to example embodiments.

Referring to FIG. 17, the accumulated error information AEI may be updated (S31) whenever the patrol read operation is performed once. It is determined whether the number PFRN of the candidate fail row addresses including the same candidate fail column address is greater than a reference number RN2 with respect to each of the candidate fail column addresses included in the accumulated error information AEI (S32), When the number PFRN is greater than the reference number RN2 (S22:YES), the post package repair operation is performed (S23) with respect to all of the candidate fail column addresses corresponding to the numbers PFRN greater than the reference number RN2. When the number PFRN is not greater than the reference error number RN1 (S32:NO), the patrol read operation is performed again to update the accumulated error information AEI and it is determined again whether the post package repair operation is required based on the updated accumulated error information AEI.

Such a sequence of the operations may be repeated until the volatile memory device is powered off (S34:NO). The accumulated error information AEI and the error attribute may be stored in a nonvolatile memory device (S35) when the volatile memory device is powered off. The accumulated error information AEI and the error attribute may be loaded from the nonvolatile memory device to the volatile memory device when the volatile memory device is powered on again so that the method of controlling repair of a volatile memory device according to example embodiments may be performed continuously even though the volatile memory device is powered off.

FIG. 18 illustrates an example of performing the post package repair operation by applying the method of FIG. 17 in case of the accumulated error table AET of FIG. 16.

FIG. 19 is a diagram illustrating an example embodiment of an accumulated error table for a method of controlling repair of a volatile memory device according to example embodiments.

Referring to FIG. 19, previous accumulated error information may be stored in the accumulated error table based on a previous patrol read operation and present accumulated error information may be stored in the accumulated error table based on a present patrol read operation next to the previous patrol read operation.

In FIG. 19, the value "0" of the index INX indicates the previous accumulated error information and the value "1" of the index INX indicates the present accumulated error information. FIG. 19 shows an example that one error corresponding to the candidate fail column address CAc is increased in the candidate fail row address RAa after performing the present patrol read operation. In contrast, one error corresponding to the candidate fail column address CAe is decreased in the candidate fail row address RAb after performing the present patrol read operation. As such, the previous accumulated error information and the present accumulated error information may be compared, an address of a candidate fail cell that is included in the previous accumulated error information and is not included in the present accumulated error information may be determined. Based on the address of the candidate fail cell, a test may be performed as will be described with reference to FIG. 20.

Figures 20, 21:
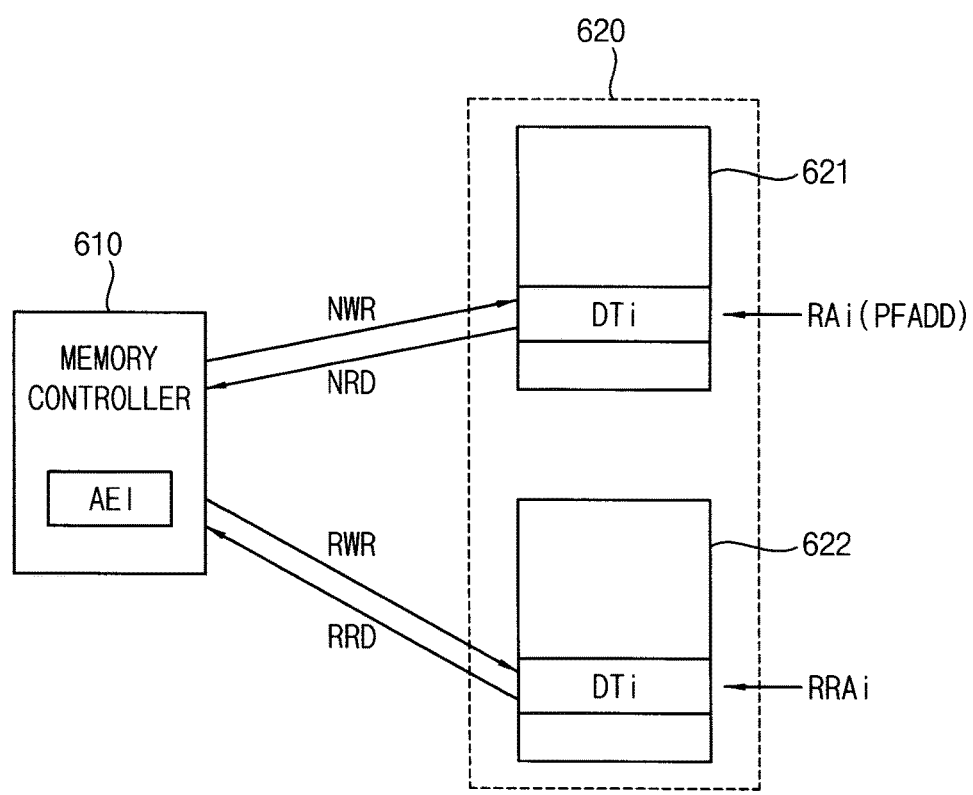
FIG. 20 is a diagram illustrating a method of determining a fail memory cell using the accumulated error table of FIG. 19.
FIGS. 21 and 22 are diagrams illustrating a method of preventing failure of a volatile memory device using accumulated error information according to example embodiments.

FIG. 20 is a diagram illustrating a method of determining a fail memory cell using the accumulated error table of FIG. 19.

Referring to FIG. 20, whether the candidate fail cell corresponding to the candidate fail column address CAe in FIG. 19 is a fail cell may be determined by writing to and reading from the candidate fail cell using a data bit and an inversion bit of the data bit.

For example, when the value "0" is read out with respect to both of the data bit and the inversion bit, the candidate fail cell may be determined as a 0-stucked fail cell that output the value "0" always. In contrast, when the value "1" is read out with respect to both of the data bit and the inversion bit, the candidate fail cell may be determined as a 1-stucked fail cell that output the value "1" always. The failure of the candidate fail cell may not be determined (UNKNOWN) for the other cases.

Figure 22:
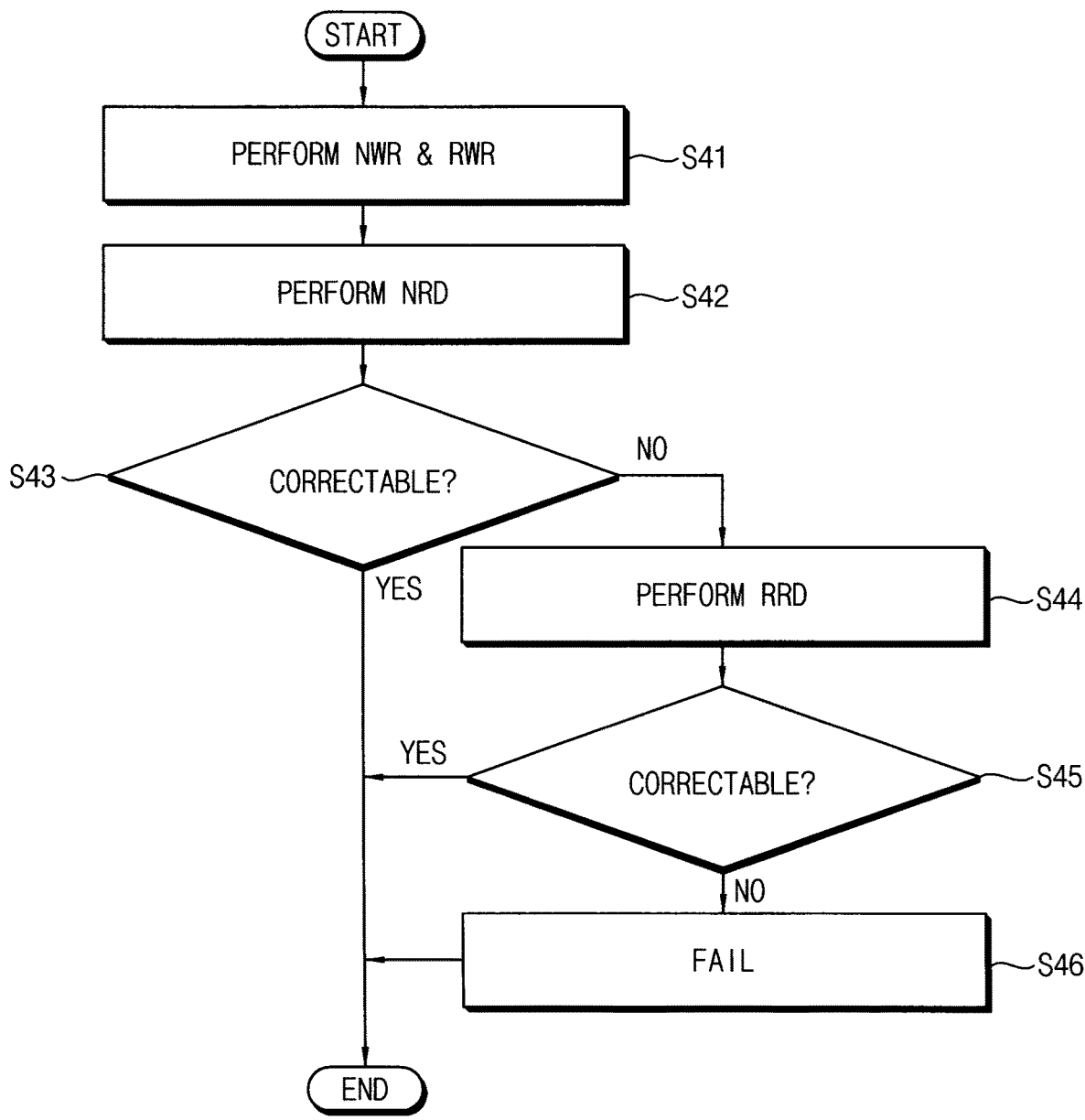

FIGS. 21 and 22 are diagrams illustrating a method of preventing failure of a volatile memory device using accumulated error information according to example embodiments.

Referring to FIGS. 21 and 22, to prevent real failure of the volatile memory device 620, when an access write operation NWR is performed by the memory controller 610 to store write data (DTi) to the candidate fail row address (PFADD) Rai in a normal cell array 621, a replica write operation RWR may be performed to additionally store the write data to a replica row address RRAi corresponding to the candidate fail row address RAi (S41) in a redundancy (or replica) cell array RCA. A normal read NRD is performed with respect to the candidate fail row address RAi (S42). When the data read from the candidate fail row address RAi includes uncorrectable errors (S43:NO), a replica read operation RRD is performed (S44). When the data read from the replica row address RRAi is correctable (S45: YES), the data read from the replica row address RRAi may be provided as the read data instead of the data read from the candidate fail row address RAi. When also the data read from the replica row address RRAi is uncorrectable (S45: NO), the volatile memory device may be determined to be failed (S46).

As such, through the replica write operation RWD and the replica read operation RRD, the failure of the volatile memory device may be further prevented, the reliability of the volatile memory device may be enhanced and the lifetime of the volatile memory device may be prolonged.

Figure 23:
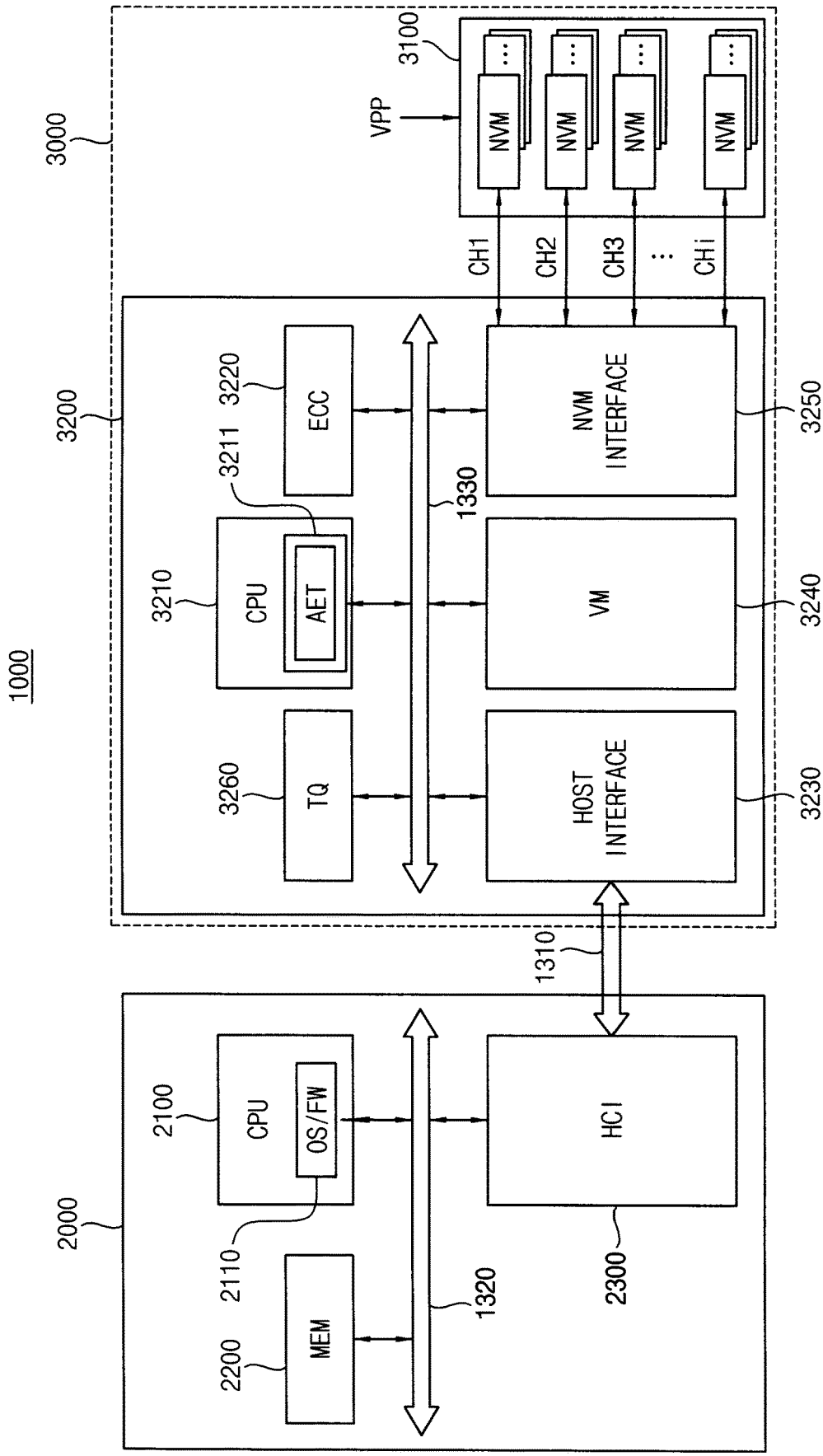
FIG. 23 is a block diagram illustrating a storage device according to example embodiments.

FIG. 23 is a block diagram illustrating a storage device according to example embodiments.

Referring to FIG. 23, a system 1000 includes a host device 2000 and a storage device 3000. For example, the host device 2000 may be an embedded multimedia card (eMMC).

The host device 2000 may be configured to control data processing operations, such as data read operations and data write operations. The data processing operations may be performed at a single data rate (SDR) or a double data rate (DDR).

The host device 2000 may be a data processing device, such as a central processing unit (CPU), a processor, a microprocessor, or an application processor, which can process data. The host device 2000 and the storage device 3000 may be embedded or implemented in an electronic device. The system 1000 of FIG. 2 may be an arbitrary electronic device.

The storage device 3000 may be electrically connected with other components of the system 1000 (electronic device) through connection means (e.g., pads, pins, buses, or communication lines) to communicate with the host device 2000.

The host device 2000 may include a processor (CPU) 2100, memory (MEM) 2200 and a host controller interface (HCI) 2300 connected through a bus 1320. Operating system (OS) and/or host firmware (FW) 2110 may be driven by the processor 2100.

The processor 2100 may include hardware and/or software for controlling generation of a command CMD, analysis of a response RES, storing of data in a register, e.g., an extended (EXT)_CSD register (not shown), of the storage device 3000, and/or data processing. The processor 2100 may drive the operation system and the host firmware 2110 to perform these operations. The host controller interface 2300 may interface with the storage device 3000.

The storage device 3000 may include multiple nonvolatile memory devices (NVM) 3100 and a storage controller 3200.

The nonvolatile memory devices 3100 may be optionally supplied with an external high voltage VPP. The nonvolatile memory devices 3100 may be implemented with flash memory, FRAM, PRAM, MRAM, etc.

The storage controller 3200 may be connected to the nonvolatile memory devices 3100 through multiple channels CH1 to CHi. The storage controller 3200 may include one or more processors 3210, an ECC block 3220, a host interface 3230, a volatile memory device 3240, a nonvolatile memory interface 3250 and a task queue 3260. In some example embodiments, the non-volatile memory devices 3100 may include on-chip ECC engines (not shown), and in this case the ECC block 3220 may be omitted.

The volatile memory device 3240 may store data used to drive the storage controller 3200. Although FIG. 23 illustrates an example embodiment where the volatile memory device 3240 is included in the storage controller 3200, the volatile memory device 3240 is not limited thereto. For example, the volatile memory device 3240 may be placed outside the storage controller 3200.

The ECC block 3220 may calculate error correction code values of data to be programmed at a writing operation, and may correct an error of read data using an error correction code value at a read operation.

The processor 3210 is configured to control overall operations of the storage controller 3200. For example, the processor 3210 may operate firmware 212 including a flash translation layer (FTL), etc. The FTL may perform various functions, e.g., address mapping, read calibration, error correction, etc.

The processor 3210 may have a function to control the volatile memory device 3240. In this case, the above-described repair manager 3211 and the accumulated error table AET may be implemented in the processor 3210. The repair manager 3211 may be implemented as hardware, software or a combination of hardware and software in the processor 3210.

The task queue 3260 may store tasks (e.g., write tasks and read tasks provided from the host device 2000) and status information of the respective tasks. The host interface 3230 may provide an interface with external devices such as the host device 2000. The nonvolatile memory interface 3250 may provide an interface with the nonvolatile memory devices 3100. The host device 2000 and the storage device 3000 may be connected through a bus 1310.

Figure 24:
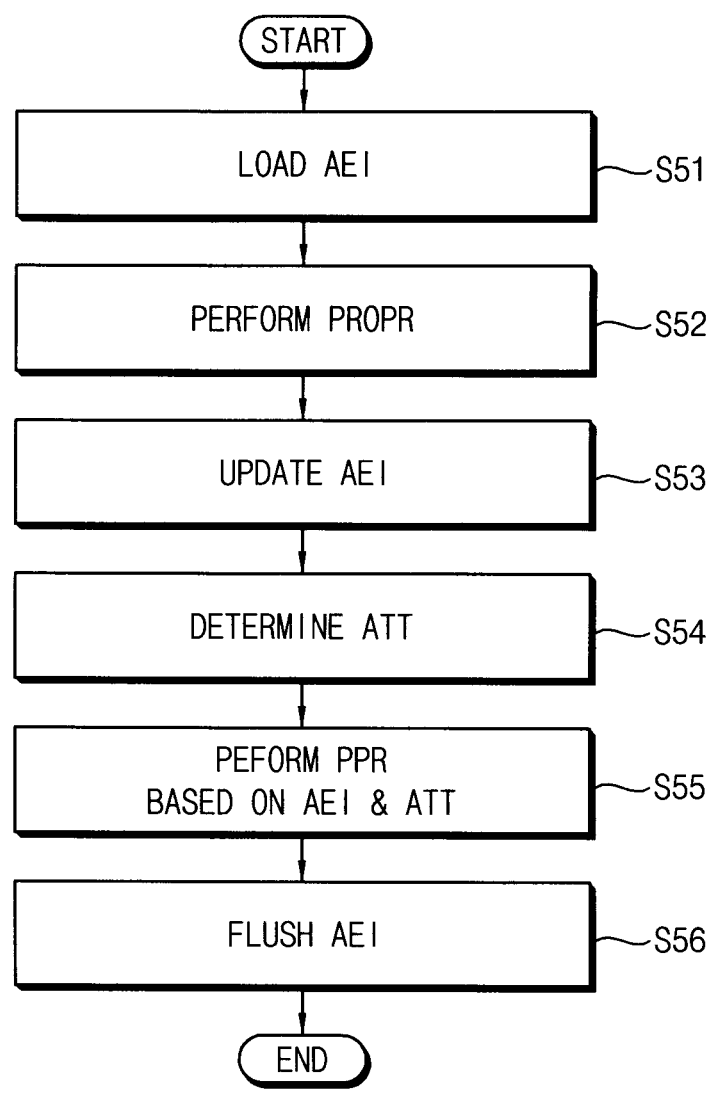
FIG. 24 is a flow chart illustrating a method of controlling repair of a volatile memory device included in a storage device according to example embodiments.

FIG. 24 is a flow chart illustrating a method of controlling repair of a volatile memory device included in a storage device according to example embodiments.

Referring to FIGS. 23 and 24, the processor 3210 may load repair information including the accumulated information AEI from the nonvolatile memory device 3100 (S51) and store the accumulated error information AEI in the accumulated error table AET. As described above, the repair manager 3211 may repeatedly perform the patrol read operation PROPR (S52) to update the accumulated error information AEI (S53). The repair manager 1311 may determine the error attribute ATT based on the accumulated error information AEI (S54) and perform the runtime repair operation, e.g., the post package repair operation based on the accumulated error information AEI and the error attribute ATT (S55). When the storage device 3000 is powered off, the accumulated error information AEI may be backed up or flushed into the nonvolatile memory devices 3100 (S56). The backup of the accumulated error table may be performed periodically event though the storage device 3000 is not powered off.

The inventive concept may be applied to any volatile memory device requiring repair and systems including the volatile memory device. For example, the inventive concept may be applied to systems such as a memory card, a solid state drive (SSD), an embedded multimedia card (eMMC), a universal flash storage (UFS), a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, etc.

The foregoing is illustrative of example embodiments and is not to be construed as limiting thereof. Although a few example embodiments have been described, those skilled in the art will readily appreciate that many modifications are possible in the example embodiments without materially departing from the disclosure.

What is claimed is:

1. A method of controlling repair of a volatile memory device, the method comprising:
  performing a patrol read operation repeatedly to identify error position information of one or more errors included in read data from the volatile memory device;
  obtaining accumulated error information by accumulating the error position information based on the patrol read operation performed repeatedly;
  identifying error attribute information based on the accumulated error information, the error attribute information indicating correlation between the one or more errors included in the read data and a structure of the volatile memory device; and
  performing a runtime repair operation with respect to the volatile memory device based on the accumulated error information and the error attribute information,
  wherein generating the accumulated error information comprises:
    storing, in an accumulated error table, one or more candidate fail row addresses having correctable errors among entire row addresses of the volatile memory device and correctable error numbers respectively corresponding to each of the one or more candidate fail row addresses, each of the correctable error numbers indicating a number of errors in a respective candidate fail row address.

2. The method of claim 1, wherein performing the runtime repair operation comprises:
  performing a post package repair operation with respect to a candidate fail row address, among the one or more candidate fail row addresses, having a correctable error number greater than a reference error number.

3. The method of claim 1, wherein performing the patrol read operation comprises:
  performing a full scanning read operation sequentially with respect to the entire row addresses of the volatile memory device; and
  performing a deep scanning read operation sequentially with respect to the one or more candidate fail row addresses.

4. The method of claim 3, wherein the deep scanning read operation is performed two or more times while the full scanning read operation is performed once.

5. The method of claim 1, wherein the obtaining the accumulated error information comprises:
  storing, in the accumulated error table, an address group including row addresses having a same correlation as a candidate fail row address, among the one or more candidate fail row addresses, based on the error attribute information.

6. The method of claim 5, wherein performing the runtime repair operation comprises:
  performing a post package repair operation with respect to all of row addresses included in the address group when a sum of the correctable error numbers of the address group is greater than a risk error number.

7. The method of claim 5, wherein identifying the error attribute information comprises:

obtaining main address error attribute information with respect to the address group including row addresses of a plurality of sub wordlines corresponding to a main wordline of the volatile memory device when a number of the one or more candidate fail row addresses included in the address group is greater than a reference number.

8. The method of claim 5, wherein identifying the error attribute information comprises:
obtaining main address error attribute information with respect to the address group including row addresses of a plurality of sub wordlines corresponding to a main wordline of the volatile memory device when a sum of the correctable error numbers corresponding to all of the row addresses included in the address group is greater than a reference number.

9. The method of claim 1, wherein generating the accumulated error information further comprises:
storing, in the accumulated error table, one or more candidate fail column addresses having the correctable errors with respect to each of the one or more candidate fail row addresses.

10. The method of claim 9, wherein identifying the error attribute information includes:
obtaining column error attribute information with respect to each of the candidate fail column addresses when a number of the one or more candidate fail row addresses including the each of the candidate fail column addresses is greater than a reference number.

11. The method of claim 10, wherein performing the runtime repair operation comprises:
performing a post package repair operation with respect to the each of the candidate fail column addresses that is identified as the column error attribute information.

12. The method of claim 1, further comprising:
when an access write operation is performed to store write data to a candidate fail row address, among the one or more candidate fail row addresses, performing a replica write operation to additionally store the write data to a replica row address corresponding to the candidate fail row address; and
when data read from the candidate fail row address includes uncorrectable errors, providing data that is read from the replica row address instead of the data read from the candidate fail row address.

13. The method of claim 12, wherein performing the runtime repair operation comprises:
performing a post package repair operation with respect to the candidate fail row address including the uncorrectable errors; and
storing data read from the replica row address to a redundancy wordline that is identified to replace a wordline corresponding to the candidate fail row address by the post package repair operation.

14. A method of controlling repair of a volatile memory device, the method comprising:
performing a patrol read operation repeatedly to identify error position information of one or more errors included in read data from the volatile memory device;
obtaining accumulated error information by accumulating the error position information based on the patrol read operation performed repeatedly;
identifying error attribute information based on the accumulated error information, the error attribute information indicating correlation between the one or more errors included in the read data and a structure of the volatile memory device;

performing a runtime repair operation with respect to the volatile memory device based on the accumulated error information and the error attribute information;
storing the accumulated error information and the error attribute information in a nonvolatile memory device when the volatile memory device is powered off; and
loading the accumulated error information and the error attribute information from the nonvolatile memory device to the volatile memory device when the volatile memory device is powered on.

15. A method of controlling repair of a volatile memory device, the method comprising:
performing a patrol read operation repeatedly to identify error position information of one or more errors included in read data from the volatile memory device;
obtaining accumulated error information by accumulating the error position information based on the patrol read operation performed repeatedly;
identifying error attribute information based on the accumulated error information, the error attribute information indicating correlation between the one or more errors included in the read data and a structure of the volatile memory device; and
performing a runtime repair operation with respect to the volatile memory device based on the accumulated error information and the error attribute information,
wherein generating the accumulated error information comprises:
storing, in an accumulated error table, previous accumulated error information including one or more previous candidate fail row addresses having correctable errors among entire row addresses of the volatile memory device and one or more previous candidate fail column addresses having the correctable errors with respect to each of the one or more previous candidate fail row addresses based on a previous patrol read operation; and
storing, in the accumulated error table, present accumulated error information including one or more candidate fail row addresses and one or more candidate fail column addresses based on a present patrol read operation.

16. The method of claim 15, further comprising:
comparing the previous accumulated error information and the present accumulated error information;
obtaining an address of a candidate fail cell that is included in the previous accumulated error information and is not included in the present accumulated error information; and
identifying whether the candidate fail cell is a fail cell by writing to and reading from the candidate fail cell using a data bit and an inversion bit of the data bit.

17. A method of controlling repair of a volatile memory device included in a storage device, the method comprising:
performing a patrol read operation repeatedly to identify error position information of one or more errors included in read data from the volatile memory device while the storage device is in an idle mode;
storing as accumulated error information, in an accumulated error table, one or more candidate fail row addresses having correctable errors, among entire row addresses of the volatile memory device, and correctable error numbers respectively corresponding to each of the one or more candidate fail row addresses by accumulating the error position information based on the patrol read operation performed repeatedly, each of the correctable error numbers indicating a number of errors in a respective candidate fail row address;

identifying error attribute information based on the accumulated error information, the error attribute information indicating correlation between the one or more errors and a structure of the volatile memory device; and performing a post package repair operation with respect to the volatile memory device based on the accumulated error information and the error attribute information.

18. A storage device comprising:

a nonvolatile memory device; and a storage controller circuit configured to control an access to the nonvolatile memory device, the storage controller circuit comprising a volatile memory device and a memory controller circuit configured to control an access to the volatile memory device, wherein the memory controller circuit or the volatile memory device includes an error check and correction (ECC) engine circuit configured to perform error detection and correction with respect to access data of the volatile memory device, and wherein the memory controller circuit is configured to:

perform a patrol read operation repeatedly to provide error position information of one or more errors included in read data from the volatile memory device regardless of an access read operation to provide data read from the volatile memory device, obtain accumulated error information by accumulating the error position information based on the patrol read operation performed repeatedly, identify error attribute information based on the accumulated error information, the error attribute information indicating correlation between the one or more errors included in the read data and a structure of the volatile memory device, and perform a runtime repair operation with respect to the volatile memory device based on the accumulated error information and the error attribute information, wherein the patrol read operation is performed during an idle mode of the storage device.

* * * * *